(12) United States Patent
Krueger et al.

(10) Patent No.: US 12,025,411 B2
(45) Date of Patent: Jul. 2, 2024

(54) VEHICLE ARMOR SYSTEMS AND METHODS

(71) Applicant: Oshkosh Defense, LLC, Oshkosh, WI (US)

(72) Inventors: Kris Krueger, Oshkosh, WI (US); Jake Leeman, Oshkosh, WI (US); Scott Mueller, Oshkosh, WI (US); Micah Richmond, Omro, WI (US); Tim Snyder, Oshkosh, WI (US); Harold Vincent, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 155 days.

(21) Appl. No.: 17/531,511

(22) Filed: Nov. 19, 2021

(65) Prior Publication Data

US 2022/0260344 A1 Aug. 18, 2022

Related U.S. Application Data

(63) Continuation of application No. 16/700,616, filed on Dec. 2, 2019, now Pat. No. 11,181,345, which is a continuation of application No. 15/956,995, filed on Apr. 19, 2018, now Pat. No. 10,495,419.

(60) Provisional application No. 62/490,947, filed on Apr. 27, 2017, provisional application No. 62/490,940, filed on Apr. 27, 2017.

(51) Int. Cl.
*F41H 7/04* (2006.01)

(52) U.S. Cl.
CPC .............. *F41H 7/048* (2013.01); *F41H 7/042* (2013.01); *F41H 7/044* (2013.01)

(58) Field of Classification Search
CPC .......... F41H 7/048; F41H 7/042; F41H 7/044; F41H 7/04; B62D 63/025
USPC ......................................................... 89/36.08
See application file for complete search history.

(56) References Cited

U.S. PATENT DOCUMENTS

| 2,380,393 | A |   | 7/1945 | Berg |
| 3,667,563 | A | * | 6/1972 | Korb ..................... B60K 15/00 |
|           |   |   |        | 180/68.5 |
| 4,813,736 | A | * | 3/1989 | Schubert ............... B62D 65/04 |
|           |   |   |        | 180/89.18 |
| 4,836,568 | A | * | 6/1989 | Preslik .................... B60R 11/06 |
|           |   |   |        | 296/180.1 |
| 4,905,569 | A |   | 3/1990 | Seksaria et al. |
| 5,007,326 | A |   | 4/1991 | Gooch et al. |
| 5,033,357 | A |   | 7/1991 | Seksaria et al. |
| 5,113,779 | A |   | 5/1992 | Amrein et al. |
| 5,398,592 | A |   | 3/1995 | Turner |
| 5,421,238 | A |   | 6/1995 | Catalano |
| 5,663,520 | A | * | 9/1997 | Ladika .................... E05B 83/01 |
|           |   |   |        | 296/187.07 |

(Continued)

*Primary Examiner* — Joshua E Freeman
(74) *Attorney, Agent, or Firm* — Foley & Lardner LLP

(57) ABSTRACT

A vehicle includes a frame, a front cabin, an armor component, and a retainer. The front cabin is coupled to the frame and selectively repositionable between an in-use position and a maintenance position. The retainer is coupled to the armor component and defines a slot extending laterally across a portion of the retainer. The vehicle is reconfigurable between an A-kit configuration and a B-kit configuration. In the A-kit configuration, the armor component is removed from the vehicle. In the B-kit configuration, the armor component is coupled to the front cabin. The retainer is offset the armor component by a retainer spacer.

20 Claims, 23 Drawing Sheets

(56) References Cited

U.S. PATENT DOCUMENTS

| | | | |
|---|---|---|---|
| 5,792,974 A | 8/1998 | Daqis et al. | |
| 6,962,102 B1 | 11/2005 | Johnston et al. | |
| 7,963,204 B2 | 6/2011 | Venton-Walters et al. | |
| 7,997,182 B1 | 8/2011 | Cox | |
| 8,096,225 B1 * | 1/2012 | Johnson | F41H 7/044 |
| | | | 89/36.02 |
| 8,402,878 B2 | 3/2013 | Schreiner et al. | |
| 8,413,567 B2 | 4/2013 | Luther et al. | |
| 8,640,594 B2 * | 2/2014 | Treadway | F41H 7/042 |
| | | | 89/929 |
| 8,667,880 B1 | 3/2014 | Berman | |
| 8,740,286 B2 * | 6/2014 | Aizik | F41H 7/042 |
| | | | 296/193.07 |
| 8,770,086 B2 | 7/2014 | Enck | |
| 8,943,946 B1 * | 2/2015 | Richmond | B62D 21/15 |
| | | | 89/36.02 |
| 8,955,859 B1 | 2/2015 | Richmond et al. | |
| 8,967,699 B1 | 3/2015 | Richmond et al. | |
| 8,998,299 B2 | 4/2015 | Shmargad | |
| 9,157,704 B2 | 10/2015 | Bayer et al. | |
| 9,328,986 B1 | 5/2016 | Pennau et al. | |
| 9,329,000 B1 | 5/2016 | Richmond et al. | |
| 9,366,507 B1 | 6/2016 | Richmond et al. | |
| 9,404,717 B2 | 8/2016 | Pfennig et al. | |
| 9,738,186 B2 | 8/2017 | Krueger et al. | |
| 9,829,282 B1 | 11/2017 | Richmond et al. | |
| 9,989,333 B2 | 6/2018 | Sumi et al. | |
| 2003/0159575 A1 * | 8/2003 | Reichman | F41H 5/0442 |
| | | | 89/36.02 |
| 2004/0020354 A1 | 2/2004 | Ravid et al. | |
| 2005/0087064 A1 | 4/2005 | Cohen | |
| 2005/0284682 A1 | 12/2005 | Hass et al. | |
| 2007/0084337 A1 | 4/2007 | Strassgurtl et al. | |
| 2007/0234895 A1 | 10/2007 | Singh et al. | |
| 2010/0037761 A1 * | 2/2010 | Boczek | F41H 7/044 |
| | | | 89/937 |
| 2010/0077913 A1 | 4/2010 | Cunningham et al. | |
| 2010/0101404 A1 * | 4/2010 | Lorenzo | E04H 9/10 |
| | | | 89/36.04 |
| 2010/0170389 A1 * | 7/2010 | North | F41H 7/044 |
| | | | 89/36.08 |
| 2010/0218667 A1 | 9/2010 | Naroditsky et al. | |
| 2010/0307329 A1 | 12/2010 | Kaswen et al. | |
| 2011/0017054 A1 | 1/2011 | Naroditsky et al. | |
| 2011/0192275 A1 | 8/2011 | Medwell et al. | |
| 2011/0252954 A1 | 10/2011 | Peryea et al. | |
| 2012/0097019 A1 * | 4/2012 | Sherbeck | F41H 7/044 |
| | | | 89/36.02 |
| 2012/0174767 A1 | 7/2012 | Naroditsky et al. | |
| 2012/0186428 A1 * | 7/2012 | Peer | F41H 7/042 |
| | | | 89/929 |
| 2013/0241237 A1 | 9/2013 | Dziuba et al. | |
| 2014/0023456 A1 * | 1/2014 | Allor | F41H 5/013 |
| | | | 470/11 |
| 2014/0060303 A1 * | 3/2014 | Enck | F41H 7/042 |
| | | | 89/937 |
| 2014/0060304 A1 * | 3/2014 | Harmon | F41H 7/044 |
| | | | 89/36.02 |
| 2014/0130656 A1 | 5/2014 | Farinella et al. | |
| 2014/0130658 A1 | 5/2014 | Gonzalez | |
| 2014/0150633 A1 | 6/2014 | Mears et al. | |
| 2014/0208931 A1 | 7/2014 | Shmargad | |
| 2014/0318359 A1 * | 10/2014 | Asaf | F41H 5/007 |
| | | | 89/36.08 |
| 2015/0300784 A1 | 10/2015 | Scarinci et al. | |
| 2016/0159401 A1 | 6/2016 | Batt | |
| 2017/0321995 A1 | 11/2017 | Sumi et al. | |

\* cited by examiner

VEHICLE ARMOR SYSTEMS AND METHODS

CROSS-REFERENCE TO RELATED APPLICATIONS

This application is a continuation of U.S. application Ser. No. 16/700,616, filed Dec. 2, 2019, which is a continuation of U.S. application Ser. No. 15/956,995, filed Apr. 19, 2018, now U.S. Pat. No. 10,495,419, which claims the benefit of U.S. Provisional Application No. 62/490,940, filed Apr. 27, 2017, and U.S. Provisional Application No. 62/490,947, filed Apr. 27, 2017, all of which are incorporated herein by reference in their entireties.

BACKGROUND

The present disclosure generally relates to the field of vehicles. More specifically, the present disclosure relates to armored vehicles that may be reconfigured for use in both combat and non-combat environments.

Vehicles may have a limited ability to quickly change between armored and unarmored configurations. Certain vehicles are required to change between armored and unarmored configurations depending on the circumstances of their operation. Armor often requires large armor panels that extend between certain components, requiring them to be removed and replaced during an up-armoring or down-armoring event. Components attached to an armor panel may require realignment when adding or removing the armor panel from a vehicle.

SUMMARY

At least one embodiment relates to a vehicle including a frame, a front cabin, an armor component, and a retainer. The front cabin is coupled to the frame and selectively repositionable between an in-use position and a maintenance position. The retainer is coupled to the armor component and defines a slot extending laterally across a portion of the retainer. The vehicle is reconfigurable between an A-kit configuration and a B-kit configuration. In the A-kit configuration, the armor component is removed from the vehicle. In the B-kit configuration, the armor component is coupled to the front cabin. The retainer is offset the armor component by a retainer spacer.

Another embodiment relates to a vehicle including a frame, a front cabin coupled to the frame, a tunnel, and a tunnel guard. The tunnel is disposed on a bottom side of the front cabin. The tunnel guard extends along both a front wall of the front cabin and a bottom side of the front cabin. The vehicle is reconfigurable between an A-kit configuration and a B-kit configuration. In the B-kit configuration, the tunnel guard includes a tunnel armor panel extending along a portion of the tunnel.

Another embodiment relates to a method of reconfiguring a vehicle. The method includes providing a frame extending longitudinally, coupling a front cabin to the frame, the front cabin configured to accept at least one occupant, and the front cabin having a front wall and a side wall, providing a plurality of bosses on at least one of the front wall and the side wall, providing an armor component, and reconfiguring the vehicle between an A-kit configuration and a B-kit configuration. The armor component is coupled to at least one of the plurality of bosses in the B-kit configuration. The armor component is removed from the vehicle in the A-kit configuration.

The invention is capable of other embodiments and of being carried out in various ways. Alternative exemplary embodiments relate to other features and combinations of features as may be recited herein.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a vehicle includes various components that improve performance relative to traditional systems. The vehicle includes a number of components (e.g., supports, a steering tray, a backing plate used to mount an engine, etc.) that have a certain structure (e.g., are structural members of the vehicle, provide structure, are supports, etc.) when the vehicle is in an A-kit configuration. A portion of the one or more components may be removed and replaced with an armor component (e.g., an armor panel, etc.) when the vehicle is reconfigured into a B-kit configuration.

Figure 1:
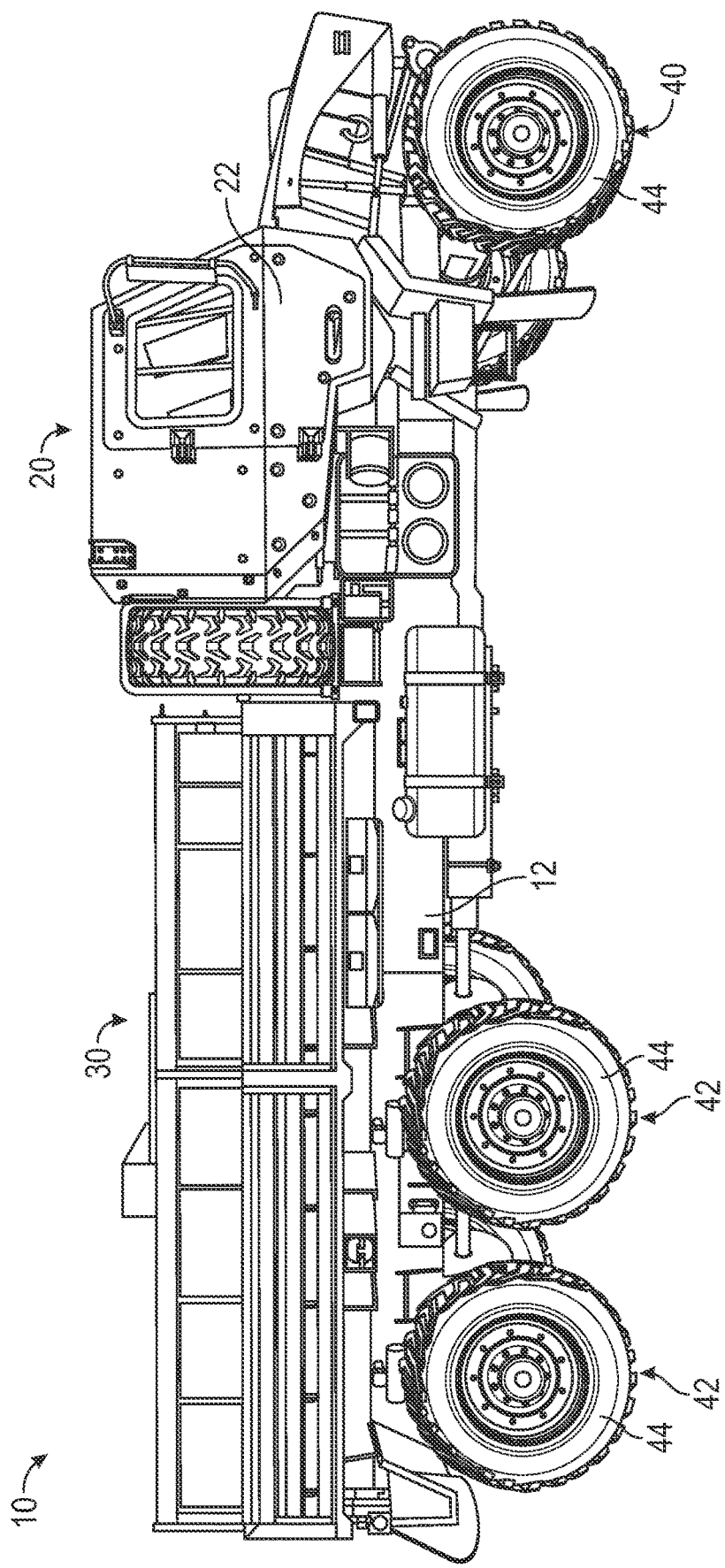
FIG. 1 is a side view of a vehicle, according to an illustrative embodiment.

According to the exemplary embodiment shown in FIG. 1, a vehicle, shown as vehicle 10, includes a chassis, shown as frame 12, that supports a body assembly including a first portion, shown as front cabin 20, and a second portion, shown as mission equipment 30. As shown in FIG. 1, the mission equipment 30 is disposed behind the front cabin 20. The frame 12 of the vehicle 10 engages a plurality of tractive assemblies, shown as front tractive assemblies 40 and rear tractive assemblies 42. According to an exemplary embodiment, the vehicle 10 is a military ground vehicle. In other embodiments, the vehicle 10 is an off-road vehicle such as a utility task vehicle, a recreational off-highway vehicle, an all-terrain vehicle, a sport utility vehicle, and/or still another vehicle. In yet other embodiments, the vehicle 10 is another type of off-road vehicle such as mining, construction, and/or farming equipment. In still other embodiments, the vehicle 10 is an aerial truck, a rescue truck, an aircraft rescue and firefighting (ARFF) truck, a concrete mixer truck, a refuse truck, a commercial truck, a tanker, an ambulance, and/or still another vehicle.

According to an exemplary embodiment, the frame 12 defines a longitudinal axis. The longitudinal axis may be generally aligned with a frame rail of the frame 12 of the vehicle 10 (e.g., front-to-back, etc.). In some embodiments, the vehicle 10 includes a plurality of front tractive assemblies 40 and/or a plurality of rear tractive assemblies 42 (e.g., one, two, etc.). The front tractive assemblies 40 and/or the rear tractive assemblies 42 may include brakes (e.g., disc brakes, drum brakes, air brakes, etc.), gear reductions, steering components, wheel hubs, wheels, tires, and/or other features. As shown in FIG. 1, the front tractive assemblies 40 and the rear tractive assemblies 42 each include tractive elements, shown as wheel and tire assemblies 44. In other embodiments, at least one of the front tractive assemblies 40 and the rear tractive assemblies 42 include a different type of tractive element (e.g., a track, etc.).

According to an exemplary embodiment, the front cabin 20 includes one or more doors, shown as doors 22, that facilitate entering and exiting an interior of the front cabin 20. The interior of the front cabin 20 may include a plurality of seats (e.g., two, three, four, five, etc.), vehicle controls, driving components (e.g., steering wheel, accelerator pedal, brake pedal, etc.), etc. According to the exemplary embodiment shown in FIG. 1, the mission equipment 30 includes a cargo body configured to facilitate transporting various military equipment (e.g., medical supplies, ammunition, weapons, missiles, personnel, etc.). In other embodiments, the mission equipment 30 includes a truck bed or a flat bed. In some embodiments, the mission equipment 30 additionally or alternatively includes a boom lift. In another embodiment, the mission equipment 30 includes an at least partially enclosed troop transport cabin configured to facilitate transporting troops (e.g., eight, ten, twelve, twenty, etc.) with the vehicle 10.

According to an exemplary embodiment, the vehicle 10 includes a powertrain system. The powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may receive fuel (e.g., gasoline, diesel, etc.) from a fuel tank and combust the fuel to generate mechanical energy. A transmission may receive the mechanical energy and provide an output to the generator. The generator may be configured to convert mechanical energy into electrical energy that may be stored by the energy storage device. The energy storage device may provide electrical energy to a motive driver to drive at least one of the front tractive assemblies 40 and the rear tractive assemblies 42. In some embodiments, each of the front tractive assemblies 40 and/or the rear tractive assemblies 42 include an individual motive driver (e.g., a motor that is electrically coupled to the energy storage device, etc.) configured to facilitate independently driving each of the wheel and tire assemblies 44. In some embodiments, a transmission of the vehicle 10 is rotationally coupled to the primary driver, a transfer case assembly, and one or more drive shafts. The one or more drive shafts may be received by one or more differentials configured to convey the rotational energy of the drive shaft to a final drive (e.g., half-shafts coupled to the wheel and tire assemblies 44, etc.). The final drive may then propel or moves the vehicle 10. In such embodiments, the vehicle 10 may not include the generator and/or the energy storage device. The powertrain of the vehicle 10 may thereby be a hybrid powertrain or a non-hybrid powertrain. According to an exemplary embodiment, the primary driver is a compression-ignition internal combustion engine that utilizes diesel fuel. In alternative embodiments, the primary driver is another type of device (e.g., spark-ignition engine, fuel cell, electric motor, etc.) that is otherwise powered (e.g., with gasoline, compressed natural gas, hydrogen, electricity, etc.).

Figure 2:
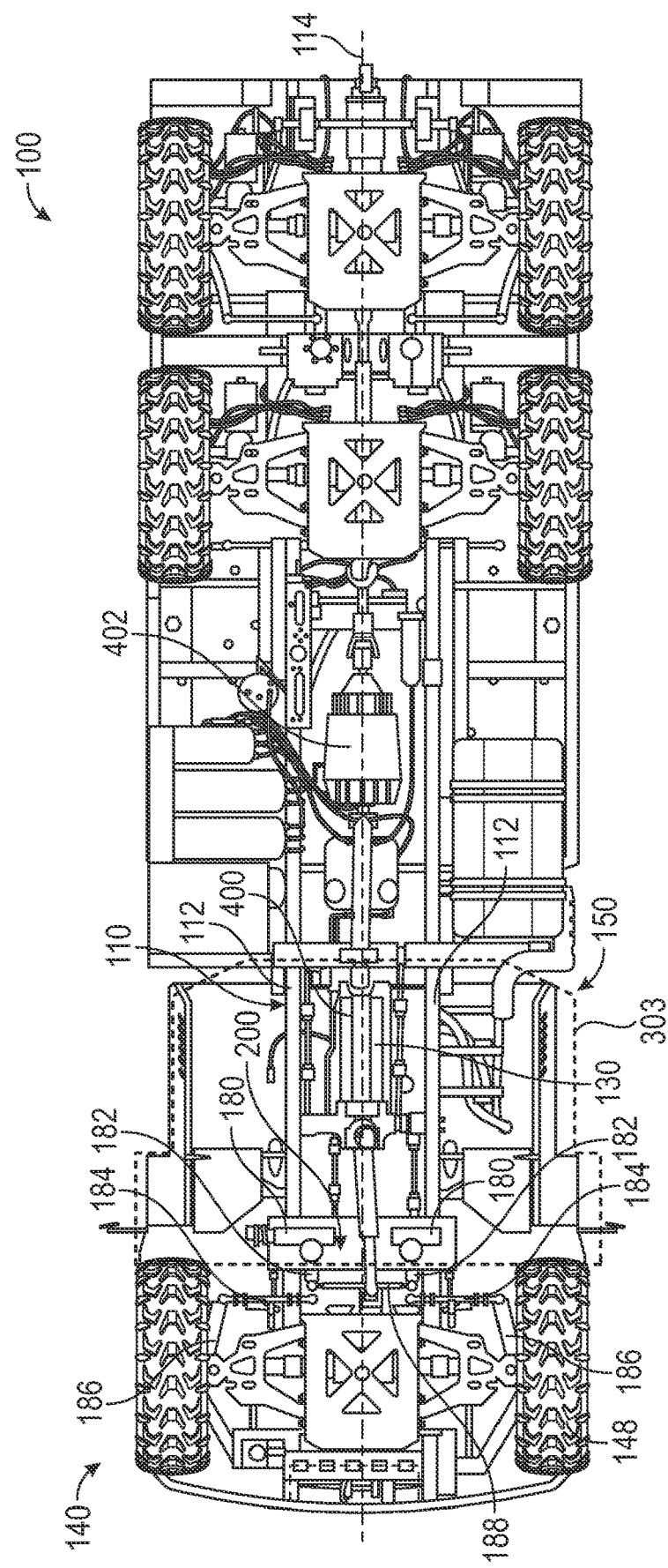
FIG. 2 is a bottom view of a vehicle, according to an illustrative embodiment.
Figure 3:
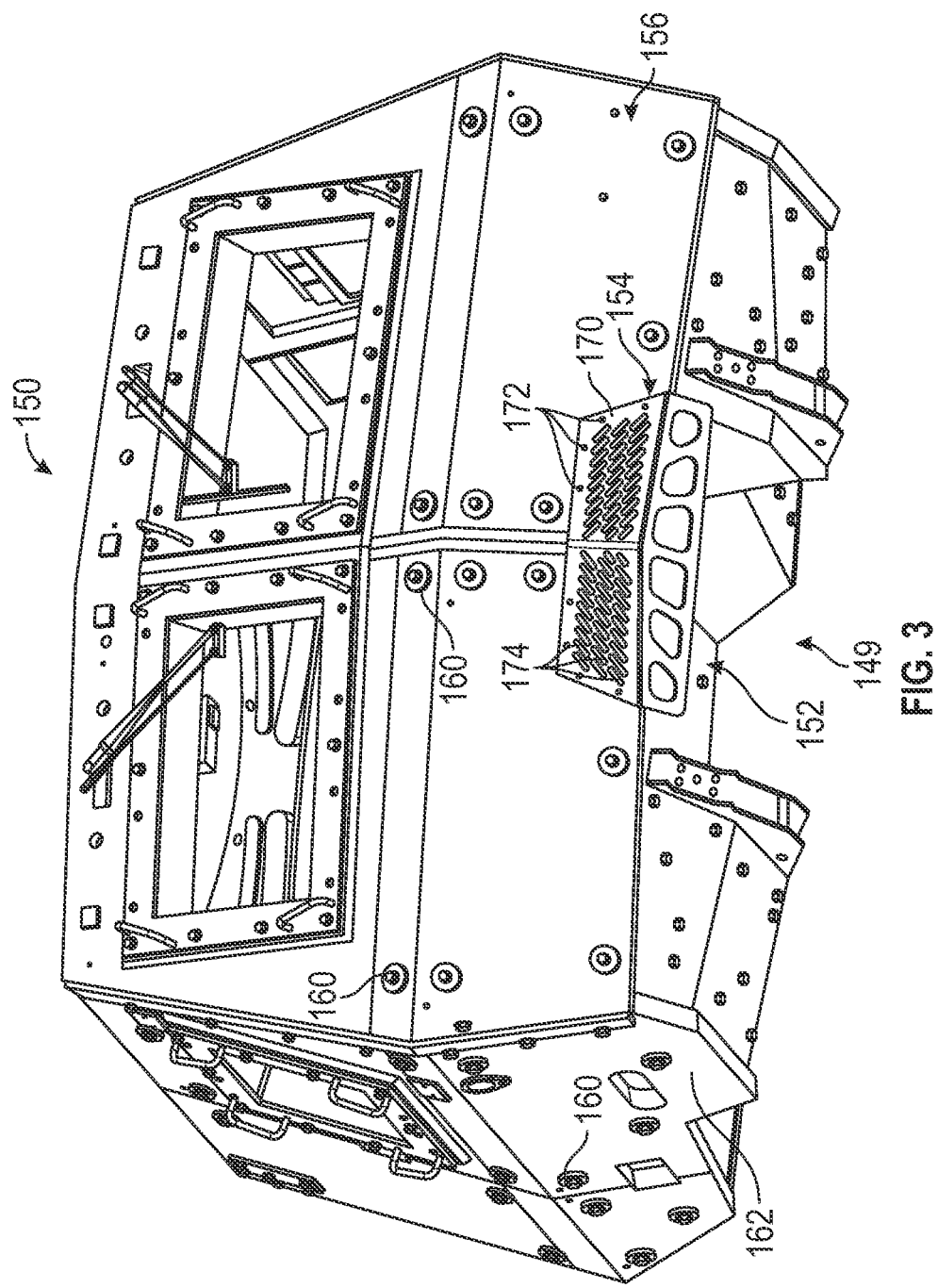
FIG. 3 is a perspective view of a front cabin of a vehicle, according to an illustrative embodiment.
Figure 4:
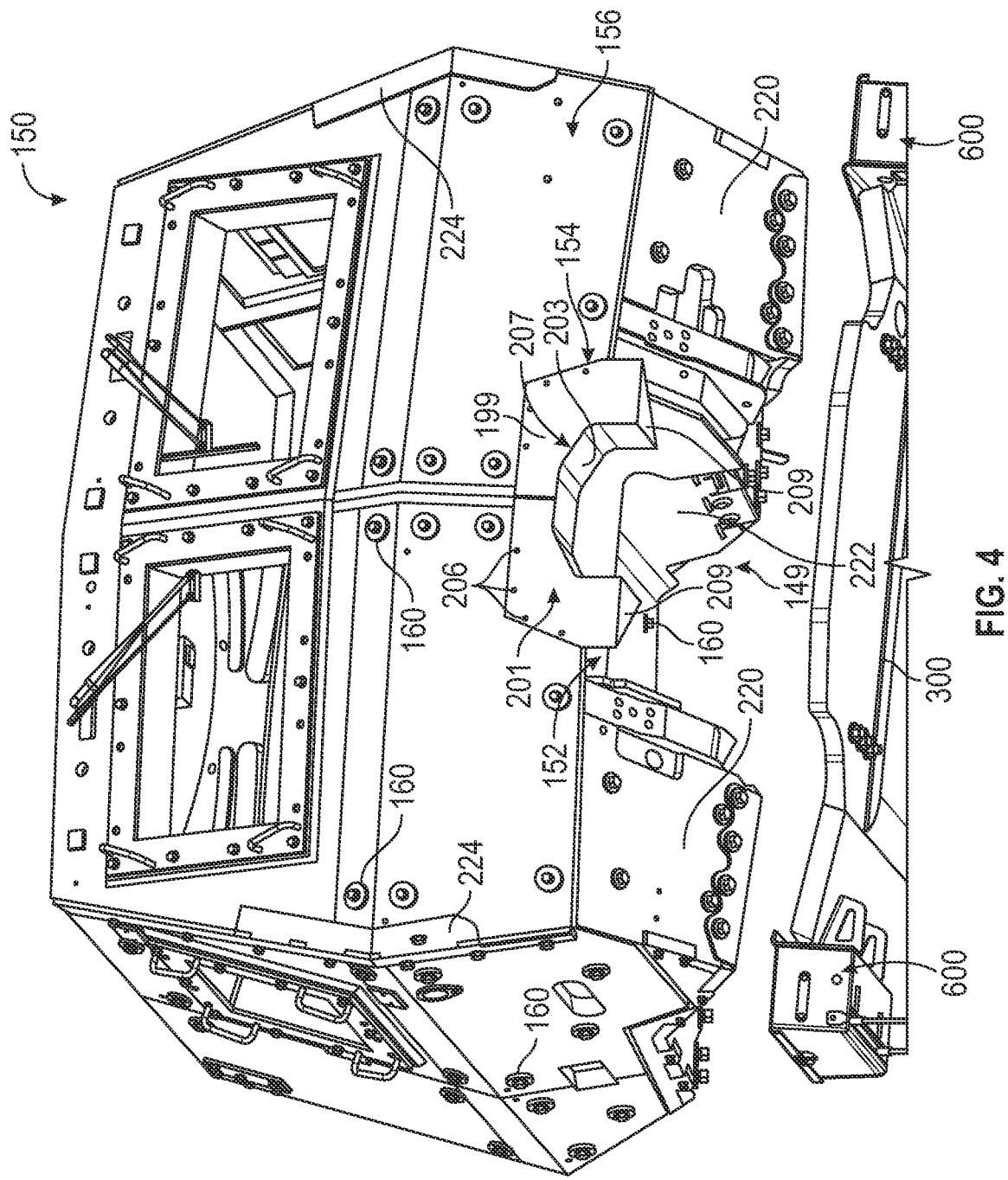
FIG. 4 is a perspective view of a front cabin of a vehicle in a B-kit configuration, according to an illustrative embodiment.
Figure 5:
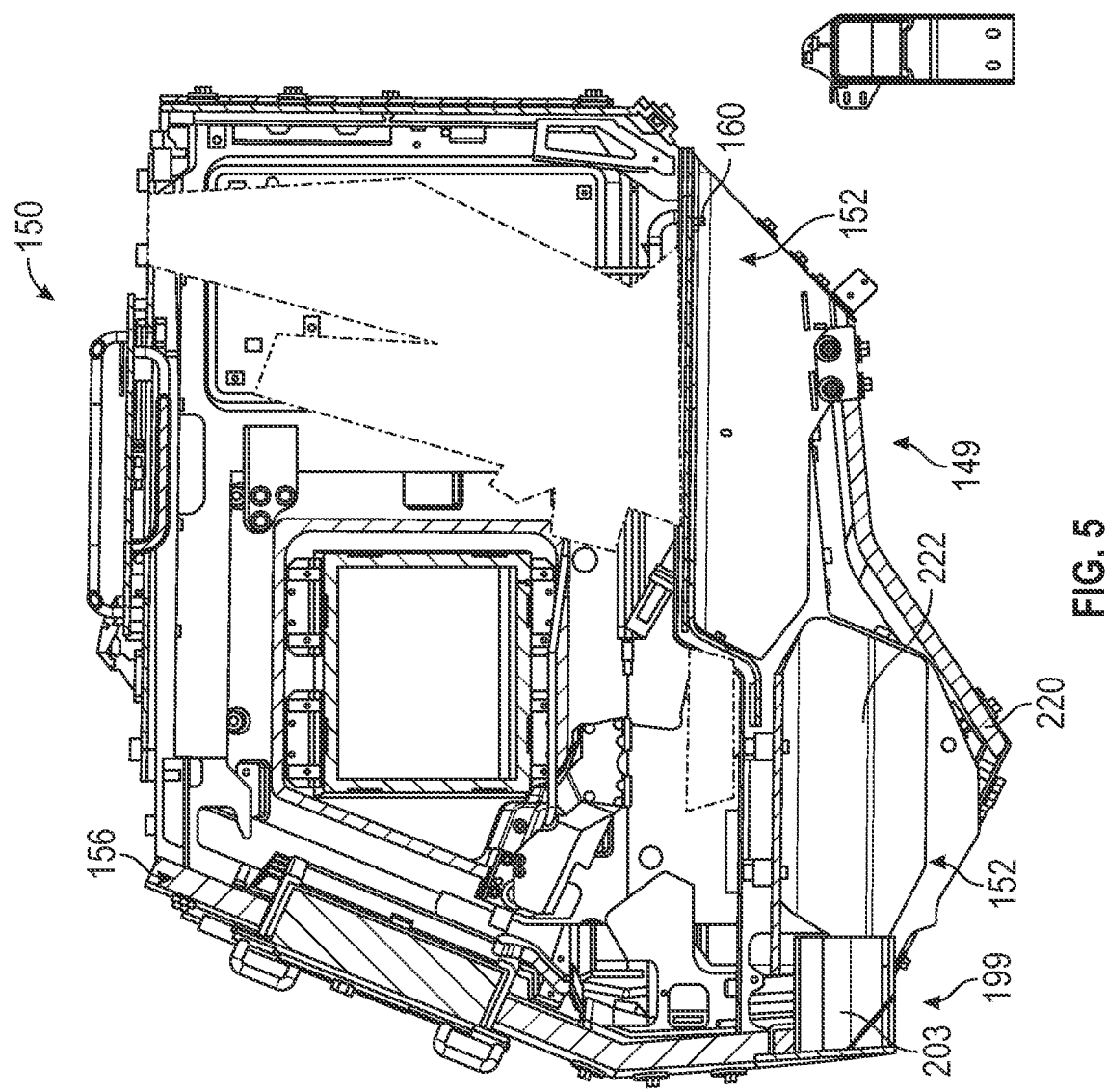
FIG. 5 is a section view of the front cabin of FIG. 4.

Referring to FIG. 2, a vehicle 100 includes a frame assembly, shown as frame 110. The vehicle 100 may be substantially similar to the vehicle 10 (shown in FIG. 1). The frame 110 may include a plurality of frame rails 112. The embodiment of FIG. 2 includes a pair of longitudinally-extending frame rails 112. The frame rails 112 may have a C-shaped cross section including a base section and two leg sections that are substantially perpendicular to the base section. Many components of the vehicle 100 couple to the base section of the frame rails 112, either directly or through another component such as a side plate, mounting bracket, etc. A longitudinal centerline 114 of the vehicle 100 is defined between the two frame rails 112 running parallel to the frame rails 112. A primary driver, shown as engine 130, is located along the longitudinal centerline 114. Coupled near a front end of the frame rails 112 is a front cabin 150. The front cabin 150 is disposed above the engine 130. In the embodiment shown in FIG. 2, the front cabin 150 is rotatable relative to the frame 110 between an in-use position and a maintenance position. In the in-use position, front cabin 150 is oriented approximately parallel to the frame 110, and the vehicle 100 may be driven normally. In the maintenance position, the front cabin 150 is rotated upwards to facilitate access to the engine 130. Referring to FIGS. 3-5, an arch-shaped recess is disposed on a bottom side 149 of the front cabin 150, shown as tunnel 152. As shown in FIGS. 3-5, the tunnel 152 extends rearward from the front wall 156. As shown in FIGS. 3-4, the front end of the tunnel 152 is defined by a cutout 154 in a front wall 156 of the front cabin 150. The engine 130 (shown in FIG. 2) is received by the tunnel 152 when the front cabin 150 is in the in-use position. The tunnel 152 facilitates the front cabin 150 sitting lower on the frame 110, lowering the center of gravity of the vehicle 100.

Referring again to FIG. 2, the vehicle 100 is reconfigurable from a lightly armored or unarmored configuration (i.e., an A-kit configuration) to a more heavily armored configuration (i.e., a B-kit configuration). In the A-kit configuration, the vehicle 100 may be relatively lightly armored. In the B-kit configuration, various armor components provide additional protection to the occupants of the vehicle 100. In the A-kit configuration, the protection the vehicle 100 is reduced, which is suitable for low-risk situations. In the B-kit configuration, the protection of the vehicle 100 is increased, which is suitable when traveling in an area where a blast event is more likely. Having the vehicle 100 easily reconfigurable between an A-kit configuration and a B-kit configuration increases the utility of the vehicle 100, facilitating dynamic use thereof in multiple situations. Additionally, expeditious reconfigurability facilitates having a relatively small number of armor kits that may be used on any vehicle in a fleet, as opposed to permanently outfitting every vehicle with armor.

In the embodiment shown in FIGS. 3-4, the front cabin 150 includes a plurality of bosses 160 extending from the exterior surfaces of the front cabin 150. In the B-kit configuration, a set of overlapping armor plates (not shown) are configured to be coupled to the bosses 160 (e.g., via a threaded connection). These overlapping armor plates increase the overall thickness of the walls of the front cabin 150, increasing the degree of protection afforded to the occupants. The overlapping armor plates cover the front walls 156 of the front cabin 150 as well as the side walls 158 of the front cabin 150.

In the embodiment of FIG. 3 a tunnel guard 170 is coupled to the front end of the tunnel 152. As shown in FIG. 3, the tunnel guard 170 is a single flat piece of material coupled to the front wall 156. A number of bolts run through apertures 172 defined near the perimeter of the tunnel guard 170 and through corresponding apertures in the front wall 156 of the front cabin 150. The tunnel guard 170 provides some protection to the front cabin 150 from blasts originating in front of the front cabin 150. The tunnel guard 170 also includes a number of ventilation holes 174 (e.g., to facilitate airflow through the tunnel 152 and across the engine 130, which is shown in FIG. 2). As shown in FIG. 4, in another embodiment a tunnel guard 199 does not include ventilation holes (and may be placed over the existing tunnel guard 170). The tunnel guard 199 includes a front portion, shown as front plate 201, coupled to a rear portion, shown as tunnel portion 203. The front plate 201 defines a set of mounting apertures 205 arranged in the same relative locations as the apertures 172 of FIG. 3. The tunnel guard 199 can be coupled to the front wall 156 similarly to the tunnel guard 170 of FIG. 3. The front plate 201 defines a cutout 207 that is arch-shaped similarly to the tunnel 152, however, the cutout 207 is smaller than the tunnel 152. Other than the mounting apertures 205 and the cutout 207, the front plate 201 is solid. The tunnel portion 203 extends rearward from the front plate 201 into the tunnel 152. The tunnel portion 203 is formed such that an inside wall of the tunnel portion 203 matches the shape of the cutout 207. A number of ribs 209 extend between the tunnel portion 203 and the front plate 201, increasing the structural rigidity of the tunnel guard 199.

As shown in the embodiment of FIG. 4, in the B-kit configuration the front cabin 150 is coupled to a number of lower armor panels 220, a tunnel armor panel 222, and a number of corner armor panels 224. Like the overlapping armor panels 162, any of the lower armor panels 220, tunnel armor panel 222, and corner armor panels 224 may be coupled to the bosses 160. As shown in FIG. 4, the lower armor panels 220 are disposed on the bottom side 149 of the front cabin 150. A side view of the lower armor panels 220, at a cross-section through the front cabin 150, is shown in FIG. 5. The lower armor panels 220 increase the protection afforded to the occupants from a blast originating underneath the front cabin 150. As shown in FIG. 4, the corner armor panels 224 are disposed on both the front wall 156 and the side wall 156 simultaneously. The corner armor panels 224 increase the blast resistance of the corners of the front cabin 150, where overlapping armor plates 162 on the side walls 158 of the front cabin 150 meet with the overlapping armor plates 162 on the front walls 156 of the front cabin 150. As shown in FIGS. 4 and 5, the tunnel armor panel 222 is coupled to the front cabin 150 via a number of bosses 160 extending from an upper surface of the tunnel 152. As shown in FIG. 5, the tunnel armor panel 222 extends along a portion of the tunnel 152 such that there is a gap between the tunnel armor panel 222 and the front wall 156. The tunnel portion 203 of the tunnel guard 199 extends across this gap, between the front wall 156 and the tunnel guard 199. The tunnel guard 199 supplements the blast protection afforded to the front cabin 150 by the overlapping armor plates 162, providing protection from blasts originating in front of and below the front cabin 150. The B-kit may provide additional armor (e.g., armor panels, transparent armor panels as windows of increased thickness and made with materials that absorb energy, etc.) to other areas of the vehicle as well (e.g., on the doors, walls, and windows of the cabin, etc.).

Figure 6:
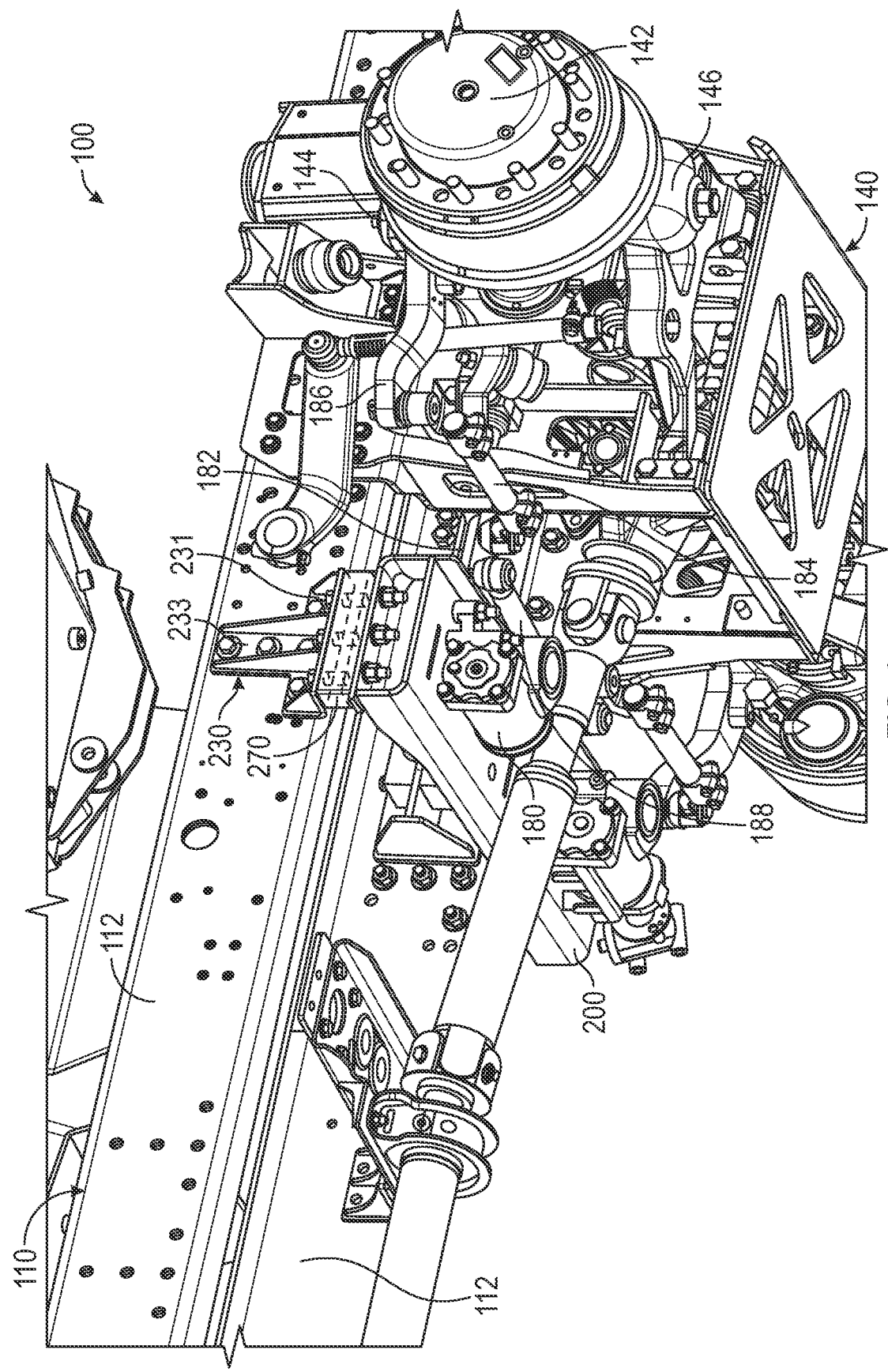
FIG. 6 is a perspective view of a vehicle in an A-kit configuration, according to an illustrative embodiment.

Returning now to FIG. 2, coupled near a front end of the frame rails 112 is a front tractive assembly 140. A prospective view of an embodiment of the front tractive assembly 140 for the vehicle 100 is shown in FIG. 6. As shown in FIG. 6, each side of the front tractive assembly 140 includes a wheel hub 142 coupled to an upper control arm 144 and a lower control arm 146. Each wheel hub 142 (shown in FIG. 2) supports a tractive element, shown as wheel and tire assembly 148, configured to contact the ground. As shown in FIGS. 2 and 6, a pair of actuators, shown as steering boxes 180, are configured to turn the wheel hubs 142 to facilitate steering of the vehicle 100. As shown in FIGS. 2 and 6, each steering box 180 is coupled to a wheel hub 142 with a first linkage, shown as arm 182, a second linkage, shown as tie rod 184, and a third linkage, shown as linkage 186. A fourth linkage, shown as connecting link 188, is rotatably coupled to both arms 182. In operation, each steering box 180 imparts a torque on its corresponding arm 182. The torque moves the tie rod 184, pulling or pushing one of the linkages 186. The linkages 186 move the hubs 142, causing the wheel hubs 142 and the wheel and tire assemblies 148 to turn. The connecting link 188 maintains a consistent distance between the arms 182, preventing one wheel and tire assembly 148 from turning without the other. In some embodiments, the lengths of the tie rods 184 are adjustable to modify the toe alignment of the wheel and tire assemblies 148.

Figure 7:
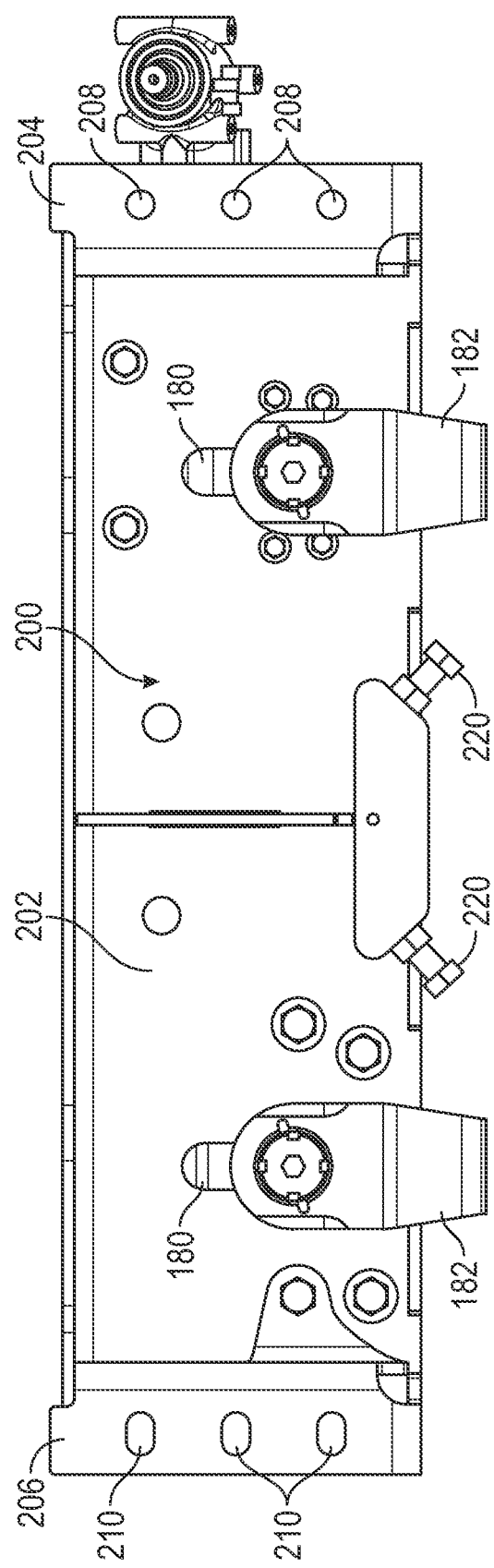
FIG. 7 is a top view of a steering tray of a vehicle, according to an illustrative embodiment.
Figure 8:
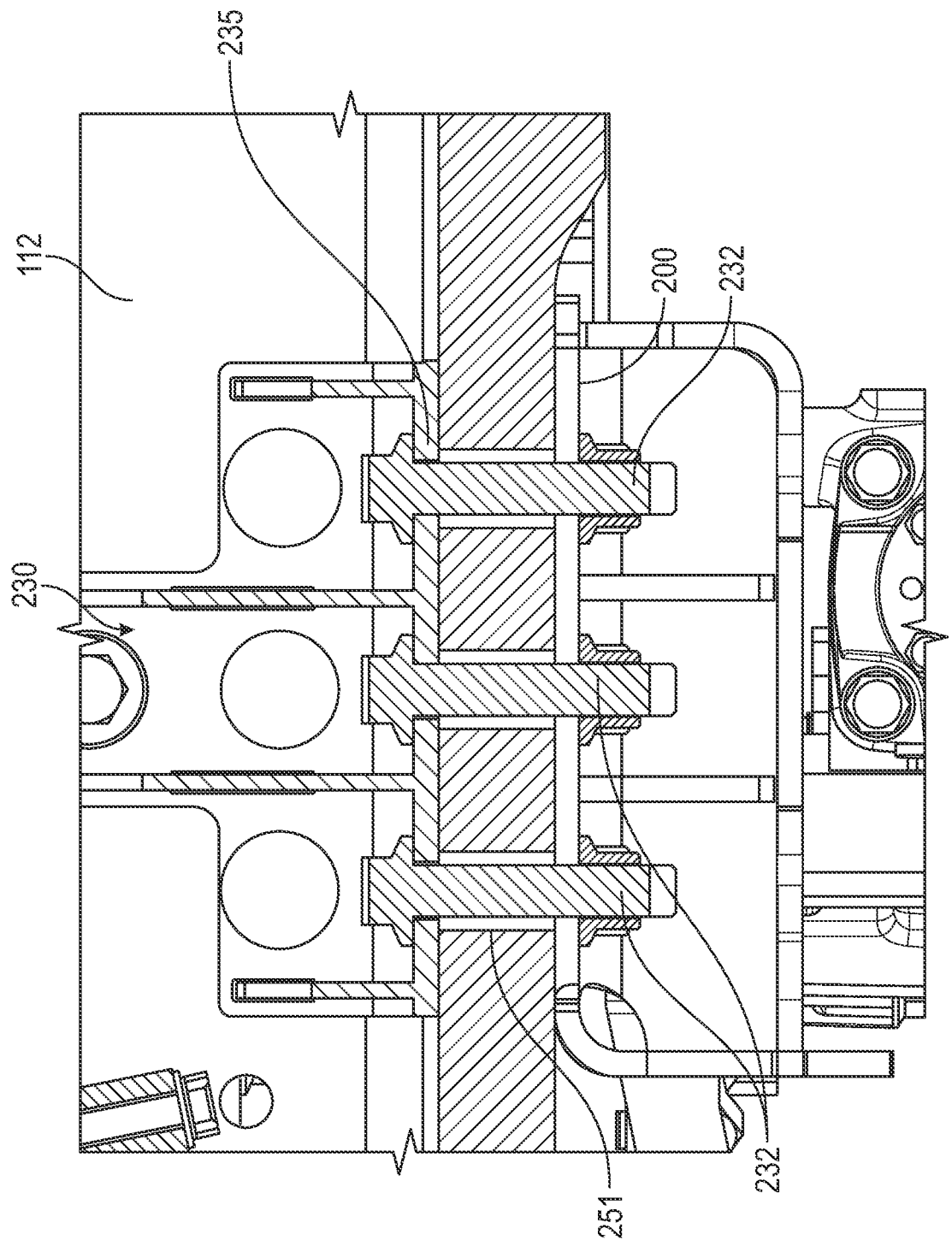
FIG. 8 is a section view of a steering tray of a vehicle, according to an illustrative embodiment.

Referring still to FIGS. 2 and 6, the steering boxes 180 are both coupled to a support, shown as steering tray 200. A bottom view of the steering tray 200 is shown in FIG. 7. As shown in FIG. 7, the steering tray 200 includes a first portion, shown as main portion 202. In one embodiment, the steering boxes 180 are coupled to the main portion 202 (e.g. rotatably coupled, etc.). A first protrusion, shown as first flange 204, is disposed at or near one end (e.g. a first end) of the main portion 202, and a second protrusion, shown as second flange 206, is disposed at or near an opposing end (e.g., a second end) of the main portion 202. The first flange 204 defines a first set of tray apertures 208 extending therethrough. The second flange 206 defines a second set of tray apertures 210 extending therethrough. A pair of stops 220 are coupled to, and extend from the main portion 202. The stops 220 are positioned such that they prevent movement of the arms 182 past predefined rotational positions. As shown in FIG. 6, the steering tray 200 is coupled to the frame rails 112 using a pair of brackets, shown as brackets 230. In the embodiment of FIG. 6, the brackets 230 are T-shaped. The brackets 230 are coupled (e.g., using bolts, etc.) to the base section of each frame rail 112. Each bracket 230 includes a horizontal portion 231 and a vertical portion 233 oriented in a direction that is substantially perpendicular to the horizontal portion 231. The horizontal portion 231 and the vertical portion 233 may be formed from a single bent piece of material. As shown, the horizontal portion 231 and the vertical portion 233 are coupled together via a number of ribs 236 that increase the structural rigidity of the bracket 230. As shown in FIG. 8, a number of fasteners, shown as bolts 232, pass through bracket apertures 235 defined in the brackets 230 and the tray apertures 208 and 210 (shown in FIG. 7) of the steering tray 200, thereby coupling the steering tray 200 to the frame 110.

Figure 9:
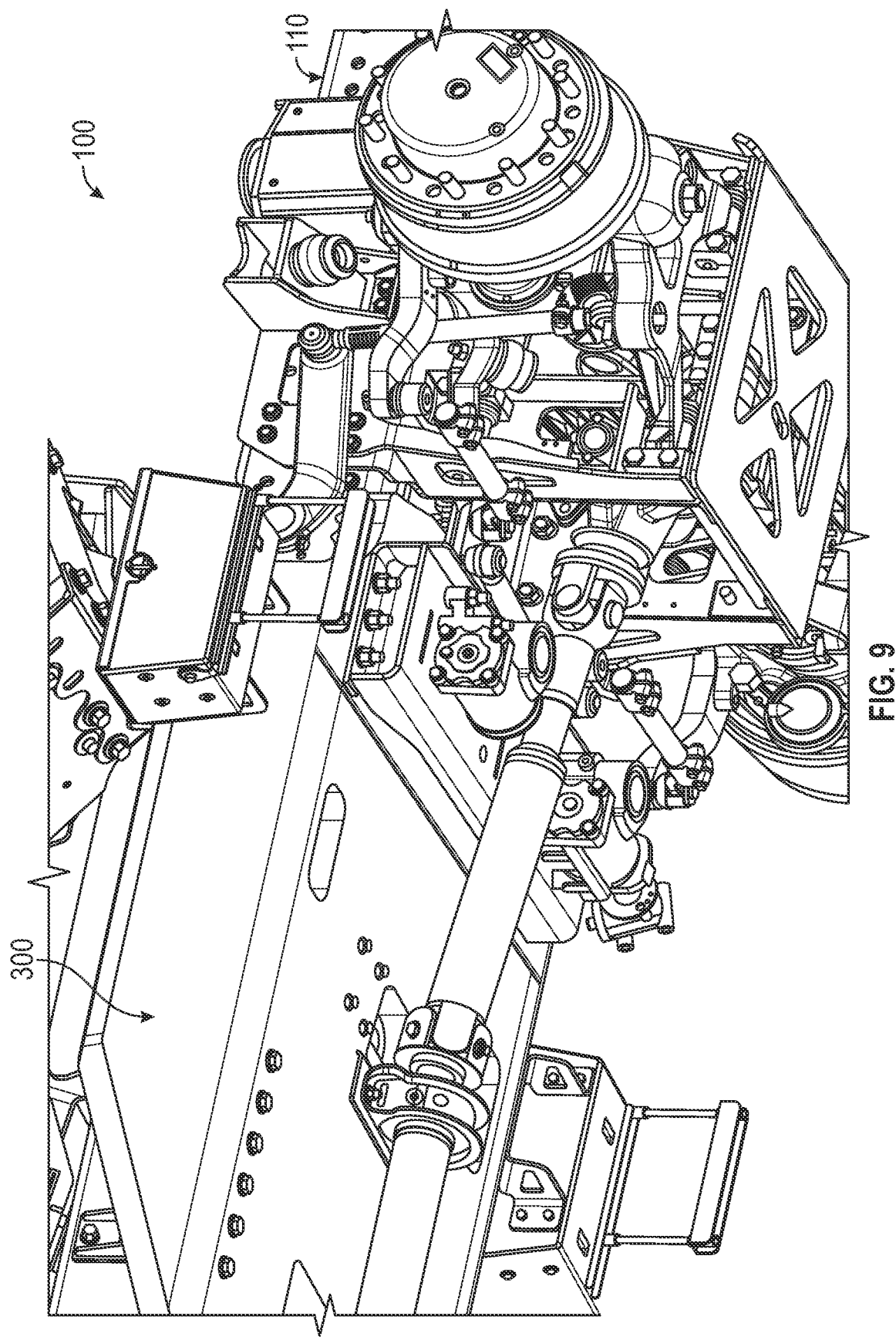
FIG. 9 is a perspective view of the vehicle of FIG. 6 in a B-kit configuration, according to an illustrative embodiment.
Figure 10:
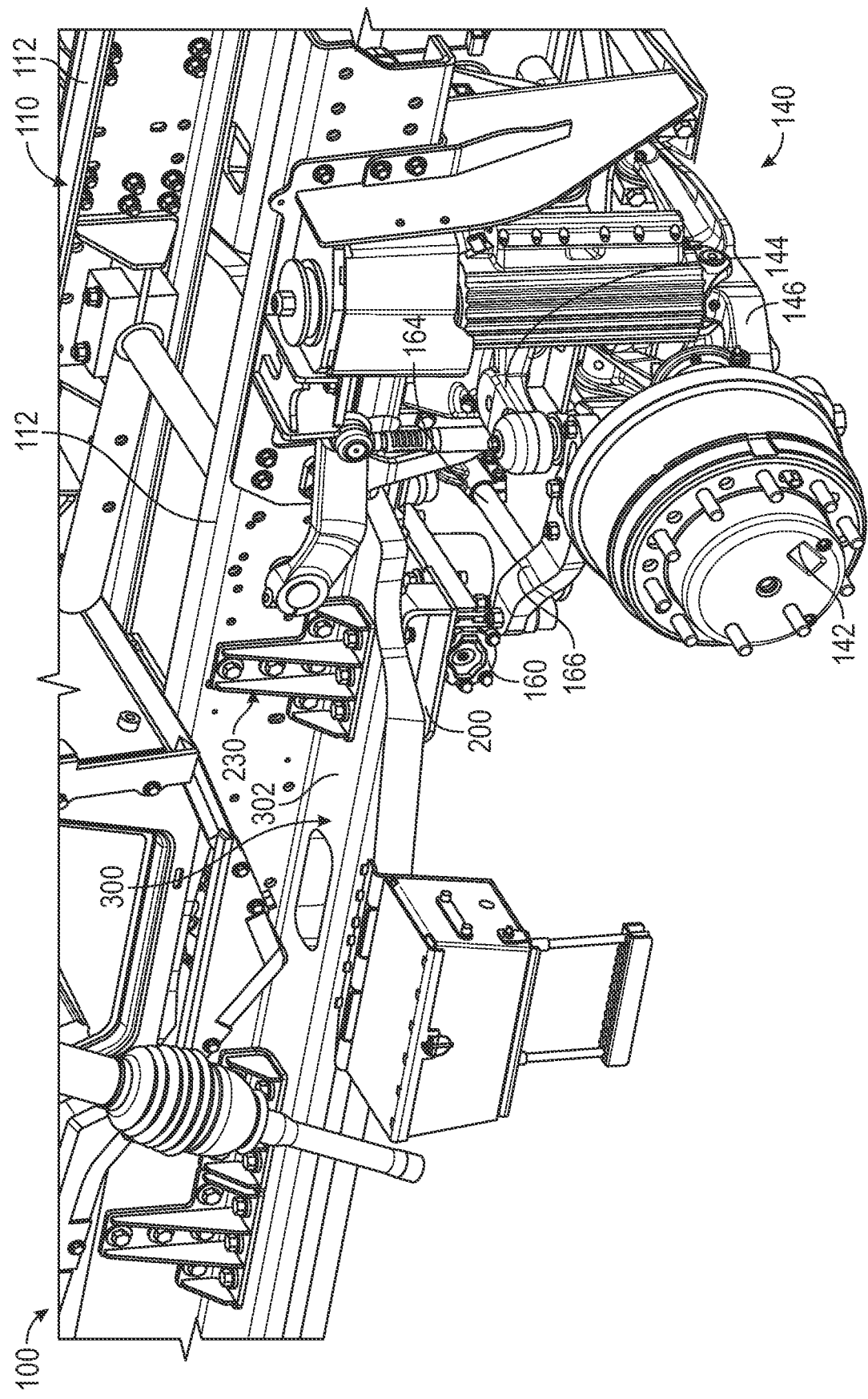
FIG. 10 is another perspective view of the vehicle of FIG. 9.
Figure 11:
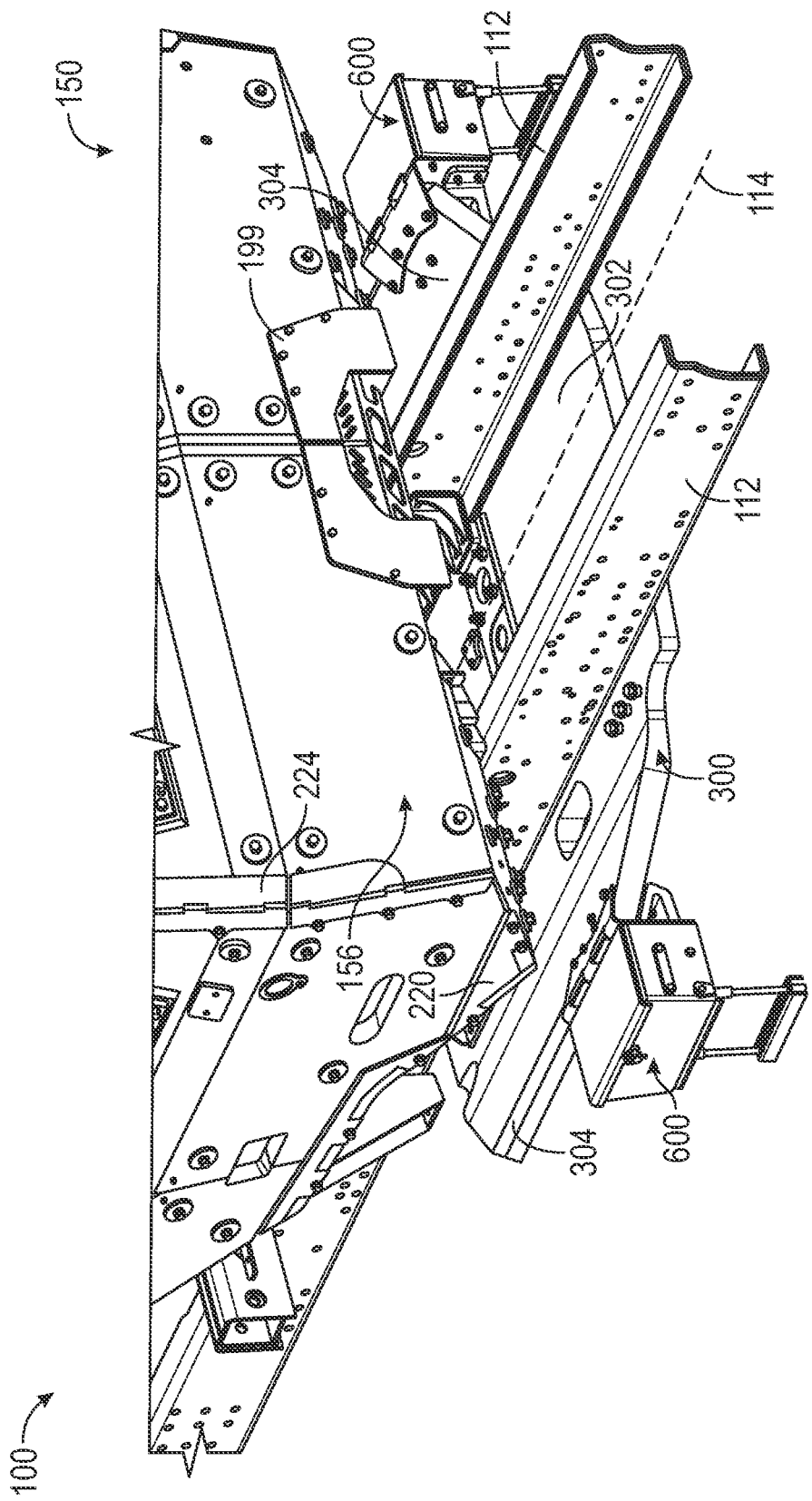
FIG. 11 is a perspective view of the vehicle of FIG. 9, with components of a suspension system removed.

To provide additional protection against an underbody blast event, in the B-kit configuration, the vehicle 100 includes one or more underbody armor panels. A prospective view of an embodiment of the front tractive assembly 140 in a B-kit configuration is shown in FIGS. 9 and 10. A prospective view of the front cabin 150 is shown in FIG. 11. As shown in FIGS. 9-11, the vehicle 100 includes an underbody armor panel 300. In an embodiment, the underbody armor panel 300 is disposed directly underneath the front cabin 150. As shown in FIG. 11, the underbody armor panel 300 extends underneath the frame 110 from near a front wall 156 of the front cabin 150 to near a rear end of the front cabin 150 of the vehicle 100 (e.g., the front cabin 20, etc.). In alternative embodiments, the underbody armor panel 300 may have a greater or lesser length along the longitudinal centerline 114. In some embodiments, the underbody armor panel 300 has a uniform thickness throughout its entirety. In other embodiments, portions of the underbody armor panel 300 have varied thicknesses (e.g., to facilitate clearance around certain components). In some embodiments, the underbody armor panel 300 defines cutouts through which other components extend. Among the various benefits, the underbody armor panel 300 may protect passengers in the front cabin 150 and the engine 130 (shown in FIG. 2) from a blast originating from underneath the vehicle 100. As shown in the embodiment of FIG. 6, in the A-kit configuration, the underbody armor panel 300 is removed.

Figure 12:
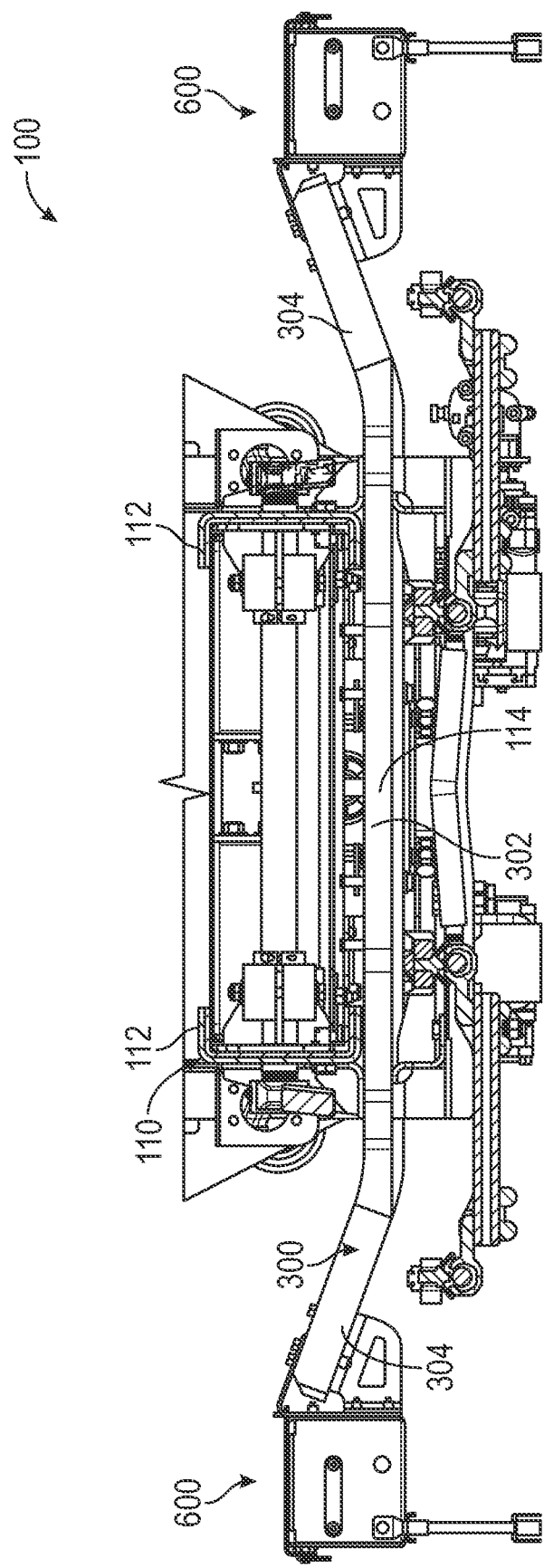
FIG. 12 is a section view of the vehicle of FIG. 9.

FIG. 12 shows a section view of the vehicle in a B-kit configuration. As shown in FIGS. 11-12, the underbody armor panel 300 is formed from a single piece (e.g., a single piece of material, multiple pieces of material formed together into one single piece) that forms a main section 302 and two side sections, shown as wings 304. The wings 304 are angled upwards relative to the main section 302. In some embodiments, the underbody armor panel 300 is made from aluminum. The angle of the wings 304 relative to the main section 302 deflects some of the blast to the sides of the vehicle 100 as opposed to absorbing the full energy of the blast into the underbody armor panel 300. FIG. 2 shows an approximate area 303 covered by the underbody armor panel 300, and FIG. 9 shows the width of the underbody armor panel 300 relative to the frame 110. As shown in FIG. 9, the main section 302 of the underbody armor panel 300 extends in a lateral direction beyond (i.e., farther from the longitudinal centerline 114 than) the frame rails 112, and the wings 304 are located laterally beyond the frame rails 112. In some embodiments, the wings 304 extend to approximately the same lateral position and have approximately the same width as the front cabin 150. In other embodiments, the wings 304 extend laterally beyond the front cabin 150.

Referring to FIG. 10, the main section 302 of the underbody armor panel 300 is coupled to the each of the frame rails 112 via a bracket, shown as bracket 230 (may be the same as bracket 230 used to secure the steering tray 200 of FIG. 6). The horizontal portion 231 of the bracket 230 is attached (e.g. bolts) to a top surface of the main section 302. The vertical portion 233 of the bracket 230 is attached (e.g. bolts) to a vertical surface of the frame rail 112 (e.g., the surface opposite the longitudinal centerline 114, the base section of the C-shaped cross section of the frame rail 112, etc.). In the embodiment of FIG. 10, each frame rail 112 is coupled to the main section 302 via three brackets 230: one near the front of the underbody armor panel 300 and two arranged proximate one another near the rear of the underbody armor panel 300. This coupling arrangement facilitates the coupling of other components on the opposite side of the underbody armor panel 300 relative to the frame 110. In the B-kit configuration of FIG. 10, the underbody armor panel 300 is disposed between the brackets 230 and the steering tray 200. To facilitate coupling the steering tray 200 to the brackets 230, the underbody armor panel 300 defines a set of apertures, through which the bolts 232 extend; for example, panel apertures 251 shown in FIG. 8.

Figure 13:
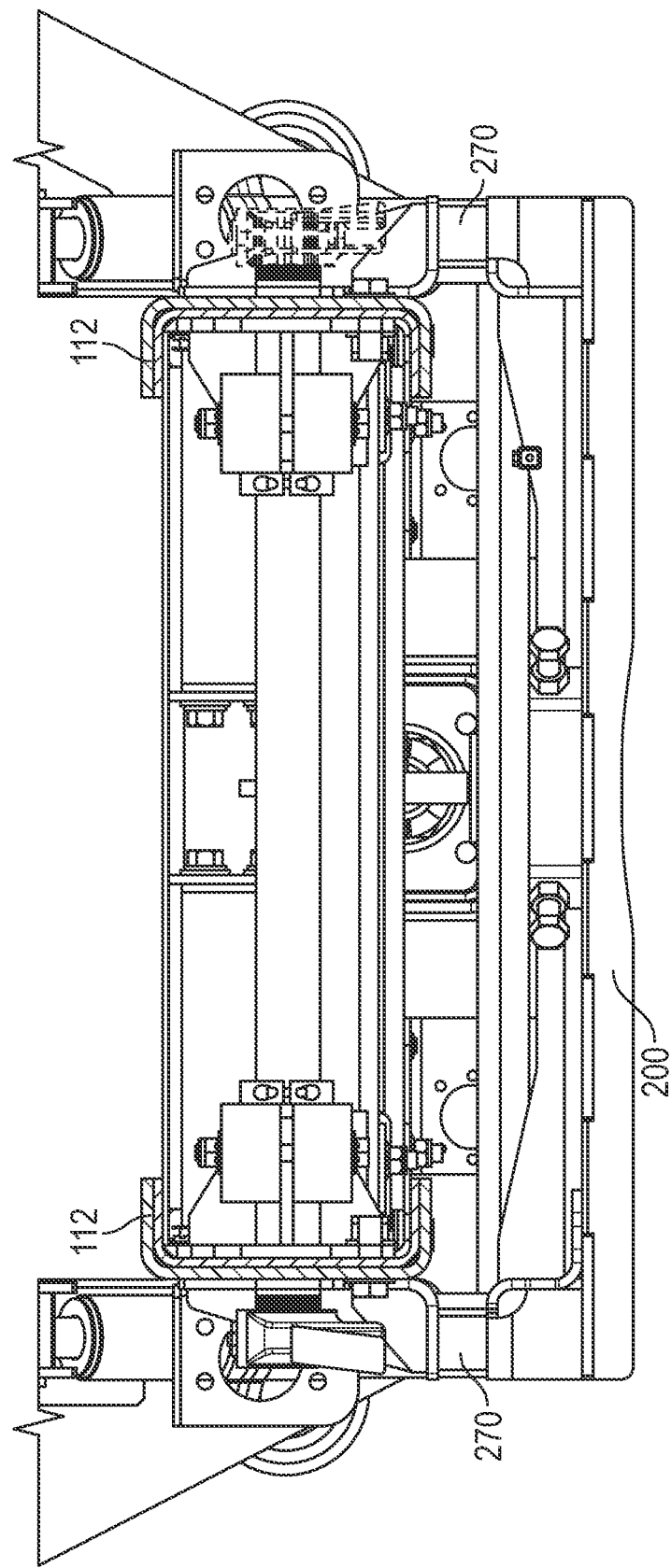
FIG. 13 is a section view of the vehicle of FIG. 6.

FIG. 13 shows a sectional view of the A-kit configuration. As shown in FIGS. 6 and 13, the underbody armor panel 300 is removed and replaced with a pair of spacers 270, one on either side of the steering tray 200. As shown in FIG. 6, each spacer 270 defines a set of apertures (similar to the panel apertures 251 of FIG. 8) through which the bolts 232 extend (also see FIG. 8). As shown in FIGS. 6 and 13, the spacer 270 may have the same or a similar thickness as the underbody armor panel 300 such that the steering tray 200 maintains a similar vertical location relative to the rest of the vehicle 100, regardless of the configuration of the vehicle 100 (e.g., regardless of whether the vehicle 100 is in an A-kit configuration or a B-kit configuration, etc.). In the A-kit configuration shown in FIGS. 6 and 13, the spacer 270 is a structural member, coupling the steering tray 200 to the frame 110. In the B-kit configuration, shown in FIGS. 10 and 12, the underbody armor panel 300 is a structural member, coupling the steering tray 200 to the frame 110. The spacer 270 (FIG. 13) and the underbody armor panel 300 (FIG. 12) are replacements for one another, facilitating expeditious changes in reconfiguration of the vehicle 100 (e.g., without needing to adjust one or more features of the steering system to account for the lower position of the steering tray 200 when changing from the A-kit configuration to the B-kit configuration, etc.).

Referring to FIG. 7, the first set of tray apertures 208 and the second set of tray apertures 210 are specifically sized, shaped, positioned, etc. to facilitate removal and replacement of the steering tray 200 when changing the configuration of the vehicle 100. The first set of tray apertures 208 are sized to fit tightly around fasteners, shown as bolts 232 (shown in FIG. 8) in both the lateral and longitudinal directions with respect to the direction of travel of the vehicle 100 (e.g., a longitudinal direction oriented substantially parallel to the longitudinal axis 114 of the vehicle 100 as shown in FIG. 2, and a lateral direction that is substantially perpendicular the longitudinal axis 114 of the vehicle 100). The corresponding bracket apertures 235 (shown in FIG. 8) in the brackets 230 through which the bolts 232 extend may similarly be sized to fit tightly around bolts 232. This tight tolerance facilitates indexing the steering tray 200 with the bolts 232, reducing the risk of the steering tray 200 being misaligned with the frame 110 after changing the configuration of the vehicle 100. Conventionally, the first set of tray apertures 208 may have a looser, clearance fit with the bolts 232, allowing the position of the steering tray 200 to change when it is removed and replaced to switch between the A-kit and B-kit configurations. This change in position may traditionally require the steering system of the vehicle 100 to be realigned every time the configuration of the vehicle is changed.

The second set of tray apertures 210 are sized to fit tightly around bolts 232 longitudinally, but are slotted laterally. The lateral slotting of the second set of tray apertures 210 facilitates providing longitudinal alignment (similar to the first set of tray apertures 208) while facilitating use of the steering tray 200 frames 110 of varying widths (e.g., by design, due to manufacturing variances, etc.).

Figure 14:
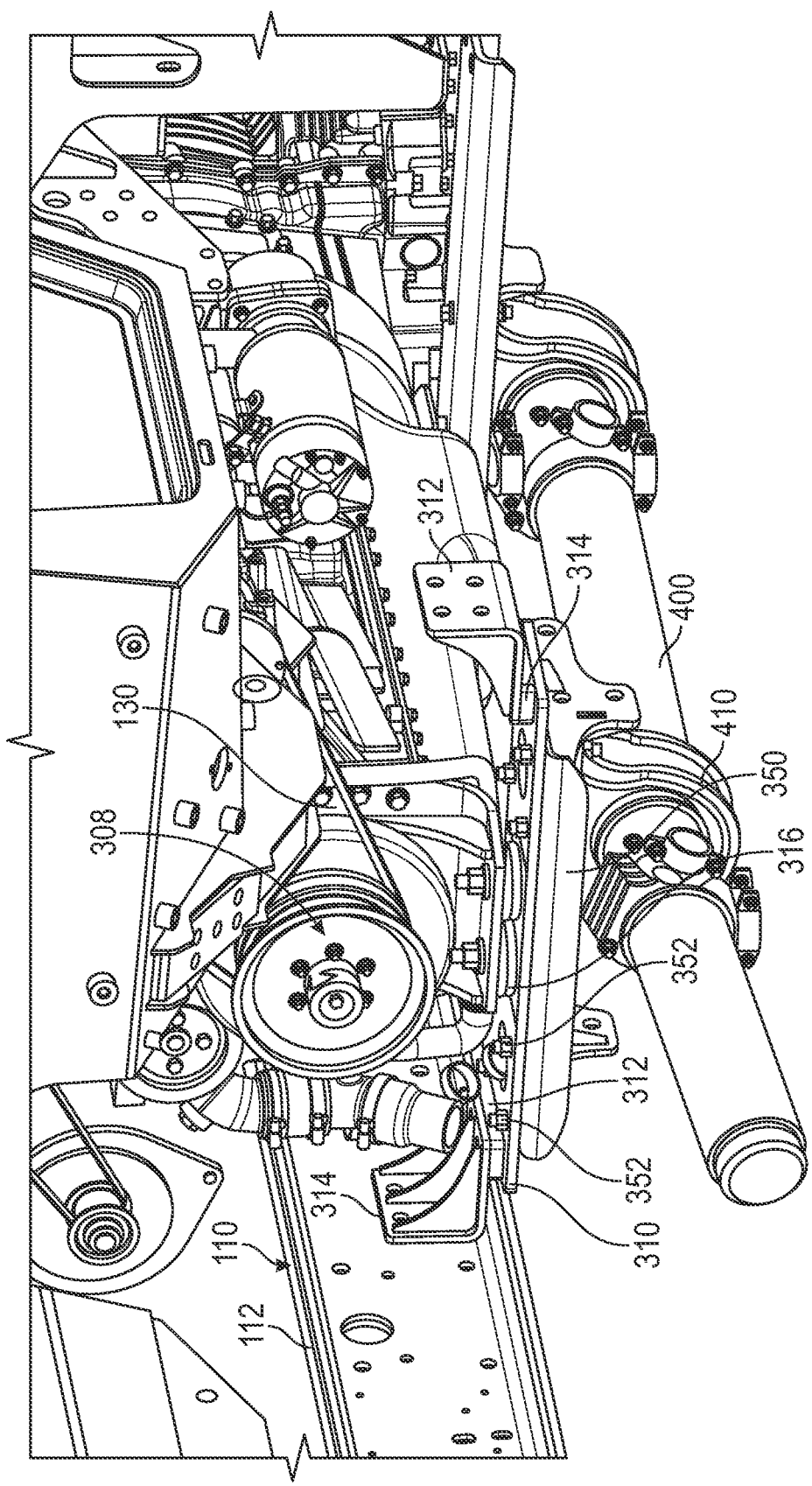
FIG. 14 is a perspective view of the vehicle of FIG. 6, near an engine.
Figure 15:
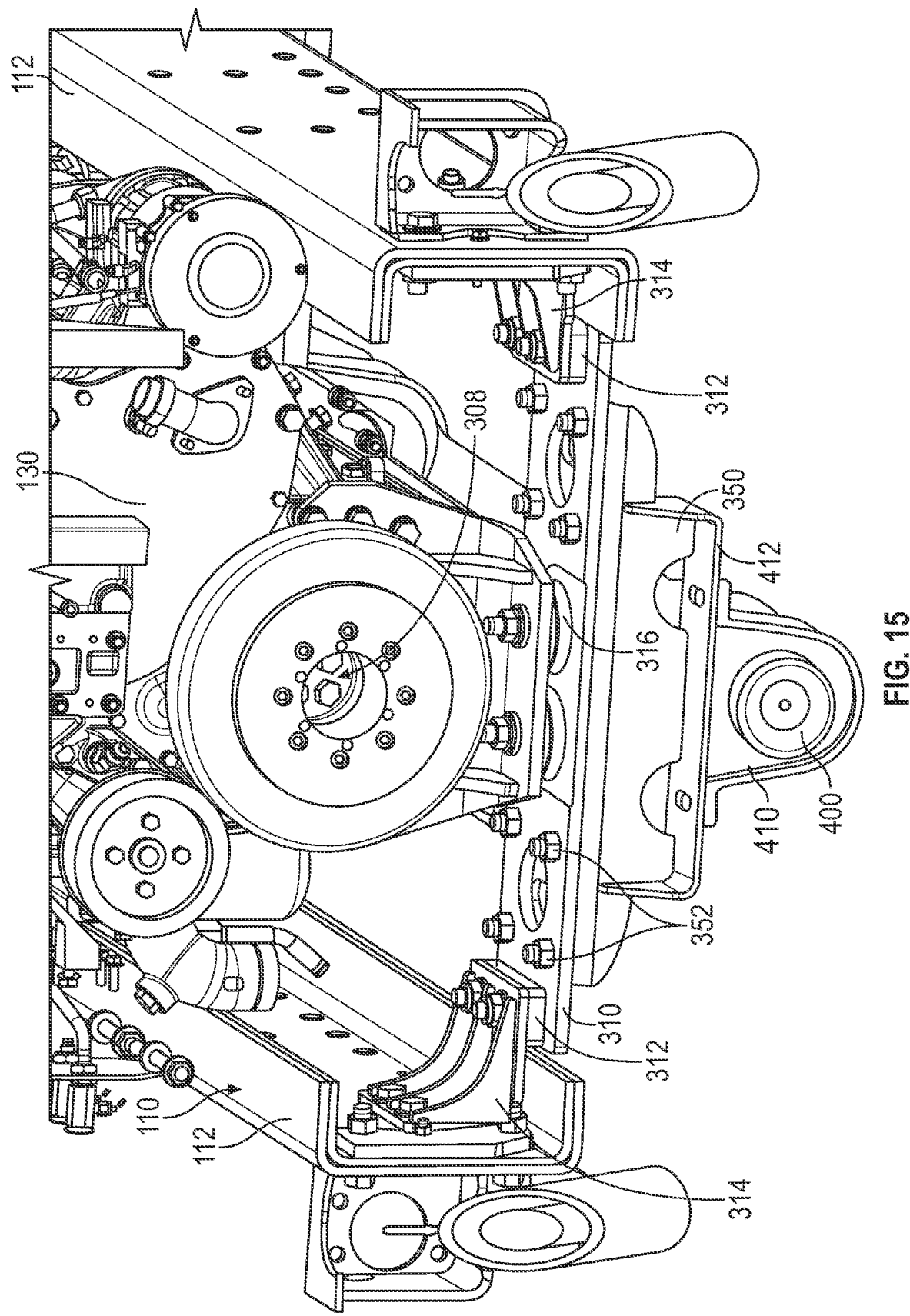
FIG. 15 is another perspective view of the vehicle of FIG. 6, near an engine.
Figure 16:
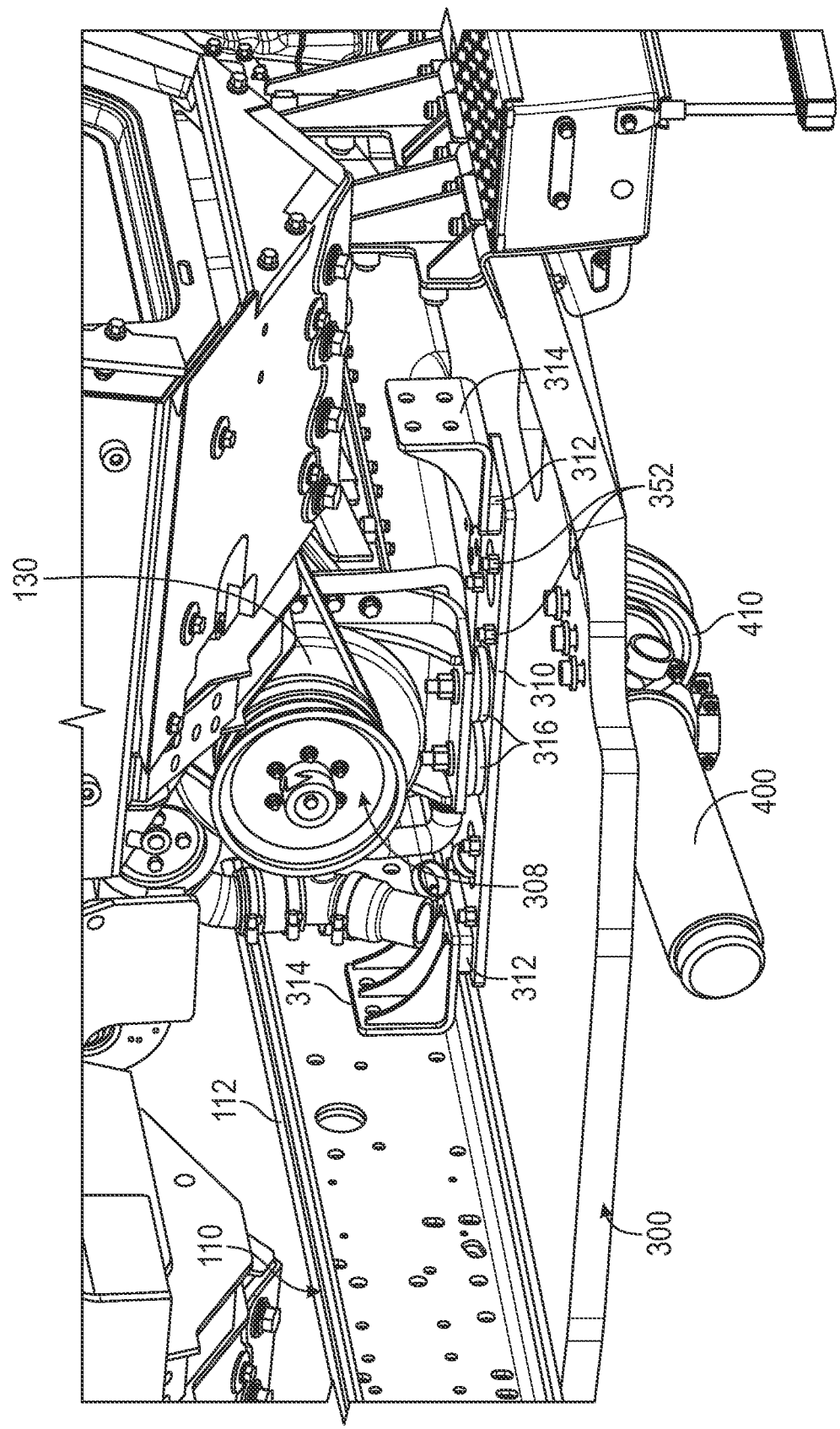
FIG. 16 is a perspective view of the vehicle of FIG. 9, near an engine.
Figure 17:
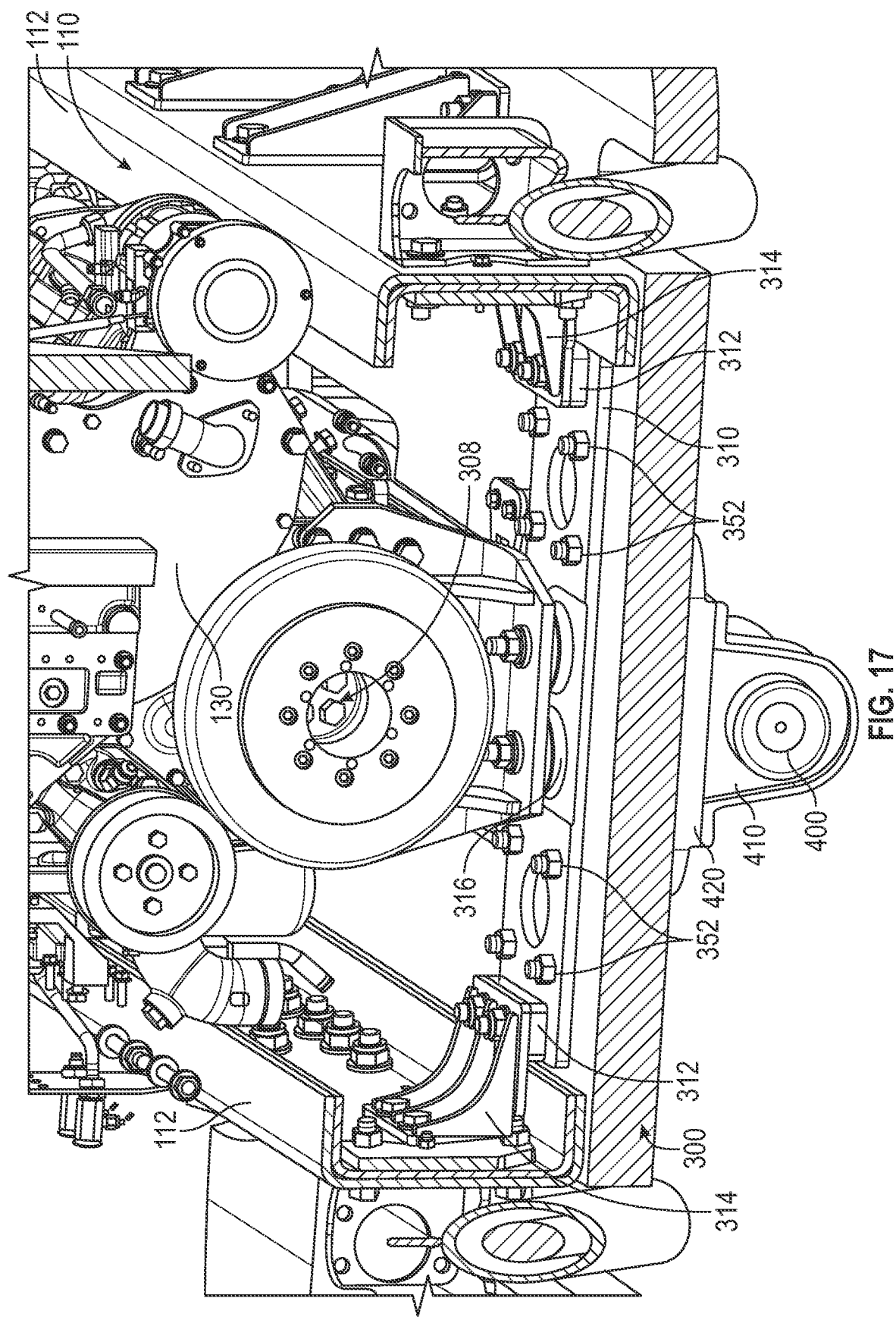
FIG. 17 is a section view through an armor component of the vehicle of FIG. 9, near an engine.

Referring back to FIG. 2, the vehicle 100 includes a primary driver, shown as engine 130. As shown, the engine 130 is disposed between the frame rails 112 and rearward of the front tractive assembly 140. FIGS. 14-17 show prospective views of the engine 130. FIGS. 14 and 15 show prospective views of the engine 130 in the A-kit configuration, while FIGS. 16 and 17 show prospective views of the engine 130 in the B-kit configuration. As shown in FIGS. 14-17, a front end 308 of the engine 130 is held by a support, shown as backing plate 310. The backing plate 310 is coupled to the internal surfaces of the base sections of both frame rails 112 with offset spacers 312 and mounting brackets 314. The mounting brackets 314 are coupled to the frame rails 112, and the offset spacers 312 are positioned to adjust the vertical location of the backing plate 310. The engine 130 is coupled to the backing plate 310 with isolation mounts 316. The isolation mounts 316 include a flexible portion that absorbs some vibration, preventing some of the vibration from the engine 130 from traveling into the frame 110. In some embodiments, the backing plate 310, mounting brackets 314 and offset spacers 312 are sized, shaped, configured, etc. to support the static load of the engine 130 (e.g., the weight of the engine 130 when the vehicle 100 is stationary, etc.) but not the dynamic load of the engine 130 (e.g., the force required to hold the engine 130 in place when the vehicle 100 is driving and/or encountering obstacles, etc.).

Referring to FIGS. 16 and 17, in the B-kit configuration, the underbody armor panel 300 extends underneath the backing plate 310. In some embodiments, the portion of the underbody armor panel 300 underneath the backing plate 310 and the portion of the underbody armor panel 300 coupled to the steering tray 200 are separate armor panels. As shown in FIGS. 16 and 17, the backing plate 310 is coupled directly to the underbody armor panel 300. The direct coupling of the underbody armor panel 300 to the backing plate 310 facilitates the underbody armor panel 300 cooperating with the backing plate 310 to support the dynamic load of the engine 130. Referring to FIGS. 14 and 15, in the A-kit configuration, the underbody armor panel 300 is omitted, and the vehicle 100 includes a spacer, shown as framework 350. The backing plate 310 is coupled directly to the framework 350. The direct coupling of the framework 350 and the backing plate 310 facilitates the framework 350 cooperating with the backing plate 310 to support the dynamic load of the engine 130. As shown in FIGS. 14 and 15, the framework 350 may have various shapes, but generally includes a portion with a relatively large vertical thickness to support the bending load from the engine 130 that is applied to the backing plate 310. As shown in FIGS. 14 and 15, the framework 350 has a width that is narrower than that of the backing plate 310. In other embodiments, the framework 350 extends to the frame rails 112.

As shown in FIGS. 16 and 17, both the framework 350 (shown in FIGS. 14 and 15) and the underbody armor panel 300 are coupled to the backing plate 310 using bolts 352 that extend through the same hole pattern in the backing plate 310. The addition of the backing plate 310 facilitates changing between the A-kit and the B-kit configurations more readily than an arrangement where the engine 130 is coupled directly to the framework 350 and/or to the underbody armor panel 300. The backing plate 310 supports the engine 130 at all times, even during a change in configuration (e.g., from the A-kit configuration to the B-kit configuration, etc.). During the change in configuration, the framework 350 (shown in FIGS. 14 and 15) is removed and replaced by the underbody armor panel 300. If the engine 130 were directly coupled to the framework 350 or the underbody armor panel 300 (e.g., if the vehicle 100 did not include the backing plate 310, etc.), then the engine 130 would need to be supported externally (e.g., by attachment of a lift to the engine 130) when the framework 350 or underbody armor panel 300 is removed. Instead, the backing plate 310 supports the static load of the engine 130, simplifying the process of changing configurations.

Referring to FIG. 2, a shaft, shown as drive shaft 400, includes multiple sections runs longitudinally along the vehicle 100 (shown in FIG. 2) underneath the framework 350 (shown in FIGS. 14 and 15) or the underbody armor panel 300 (shown in FIGS. 16 and 17) of the A-kit configuration or the B-kit configuration, respectively. In the A-kit configuration, the framework 350 is disposed between the engine 130 and the drive shaft 400. The drive shaft 400 provides power from a transfer case 402 to the front tractive assembly 140. As shown in FIGS. 14-17, the drive shaft 400 is supported by a bearing, shown as bearing assembly 410. The bearing assembly 410 holds the drive shaft 400 in place while permitting free rotation thereof. As shown in FIGS. 14 and 15, in the A-kit configuration, the bearing assembly 410 is coupled to the framework 350. The framework 350 includes an extension 412 to which the bearing assembly 410 is coupled. In some embodiments, the extension 412 contacts the bearing assembly 410 along a flat, horizontally extending surface. The distance between the backing plate 310 and the bearing assembly 410 is defined by the geometry of the framework 350. As shown in FIGS. 16 and 17, in the B-kit configuration, the bearing assembly 410 is coupled to the underbody armor panel 300. As shown in FIG. 17, in some embodiments, the bearing assembly 410 is coupled to the underbody armor panel 300 with a plate, shown as spacer plate 420. In other embodiments, the bearing assembly 410 is coupled directly to the underbody armor panel 300. The spacer plate 420 may be coupled to the underbody armor panel 300 and the backing plate 310 using the bolts 352. The distance between the backing plate 310 and the bearing assembly 410 is defined by the combined thickness of the underbody armor panel 300 and the spacer plate 420. The underbody armor panel 300 and the spacer plate 420 may combine to provide a thickness that locates the drive shaft 400 in a specific vertical location (e.g., the same vertical location as that of the drive shaft 400 in the A-kit configuration when the bearing assembly 410 is coupled to the framework 350, etc.). The interchangeability of the underbody armor panel 300, the framework 350 (shown in FIGS. 14 and 15), and the spacer plate 420 reduces the risk of one or more sections of the drive shaft 400 being oriented at a steep angle relative to one another in different configurations, which could otherwise produce premature wear on the joints between the sections of the drive shaft 400.

Figure 18:
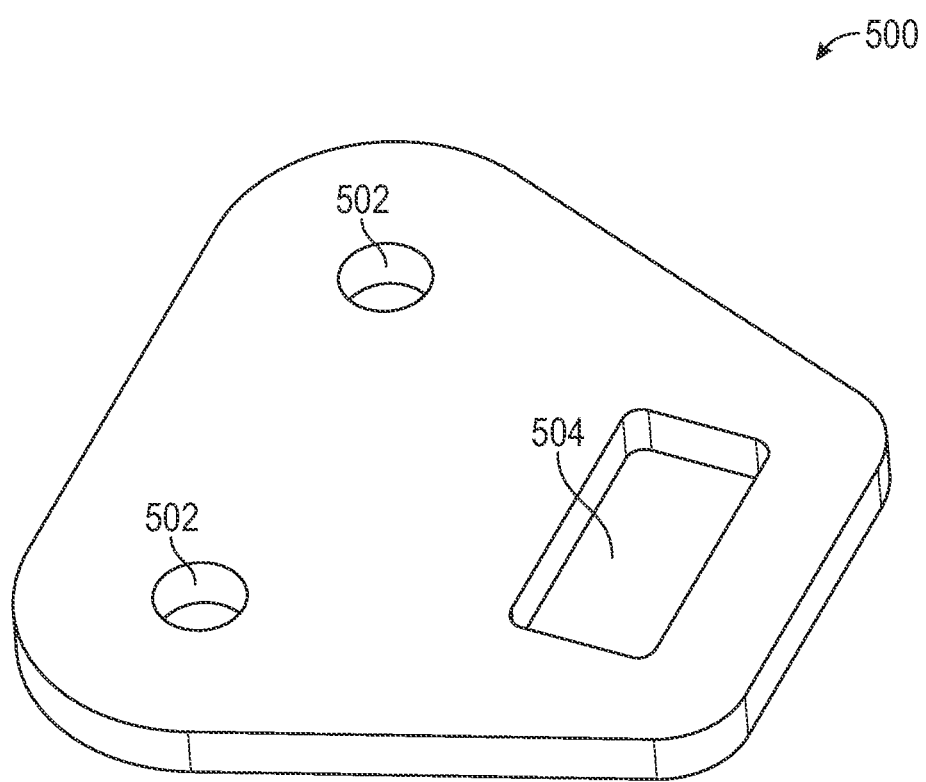
FIG. 18 is a perspective view of a retainer, according to an illustrative embodiment.
Figure 19:
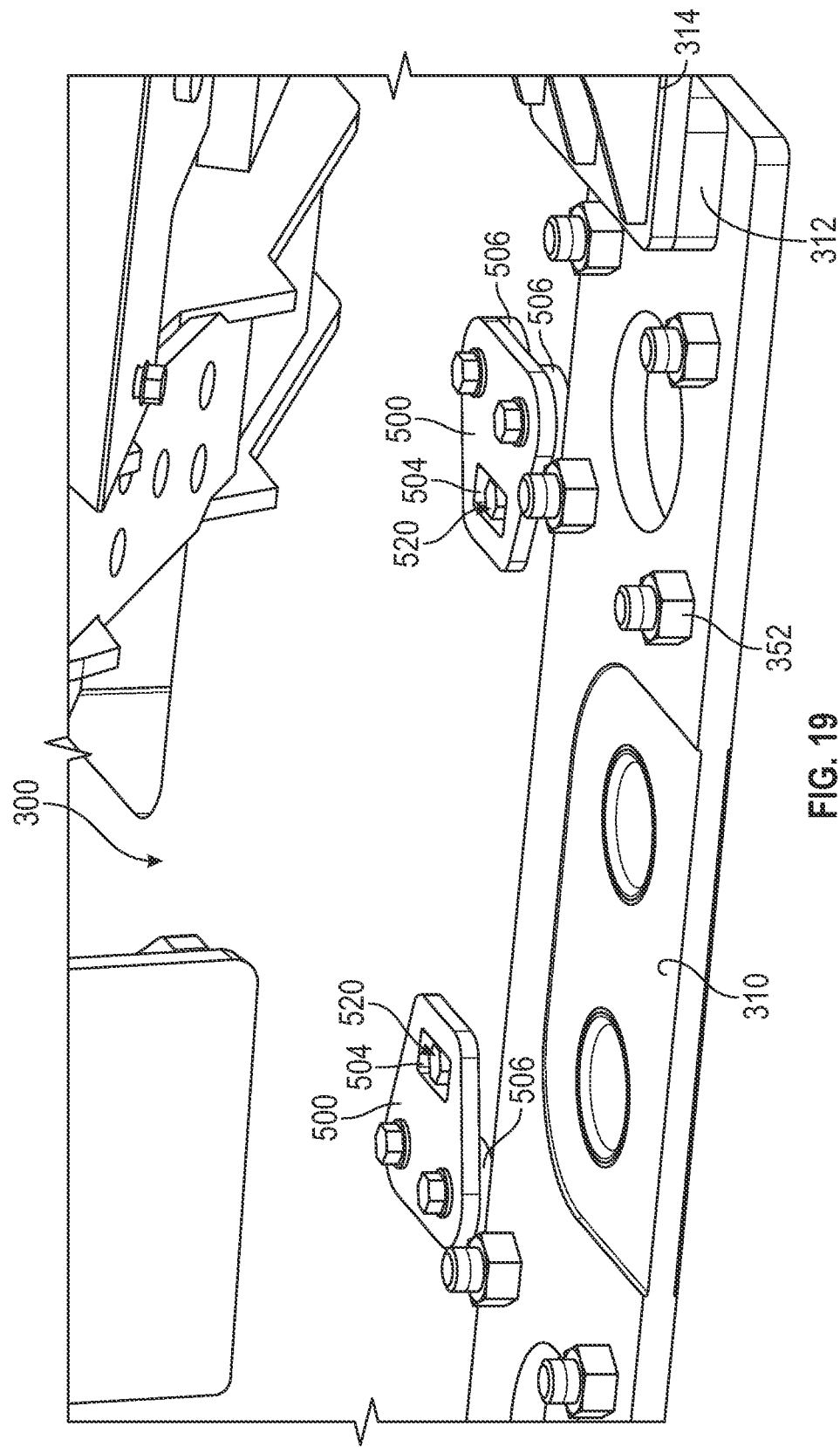
FIG. 19 is a perspective view of the retainer of FIG. 18 assembled on an armor component.
Figure 20:
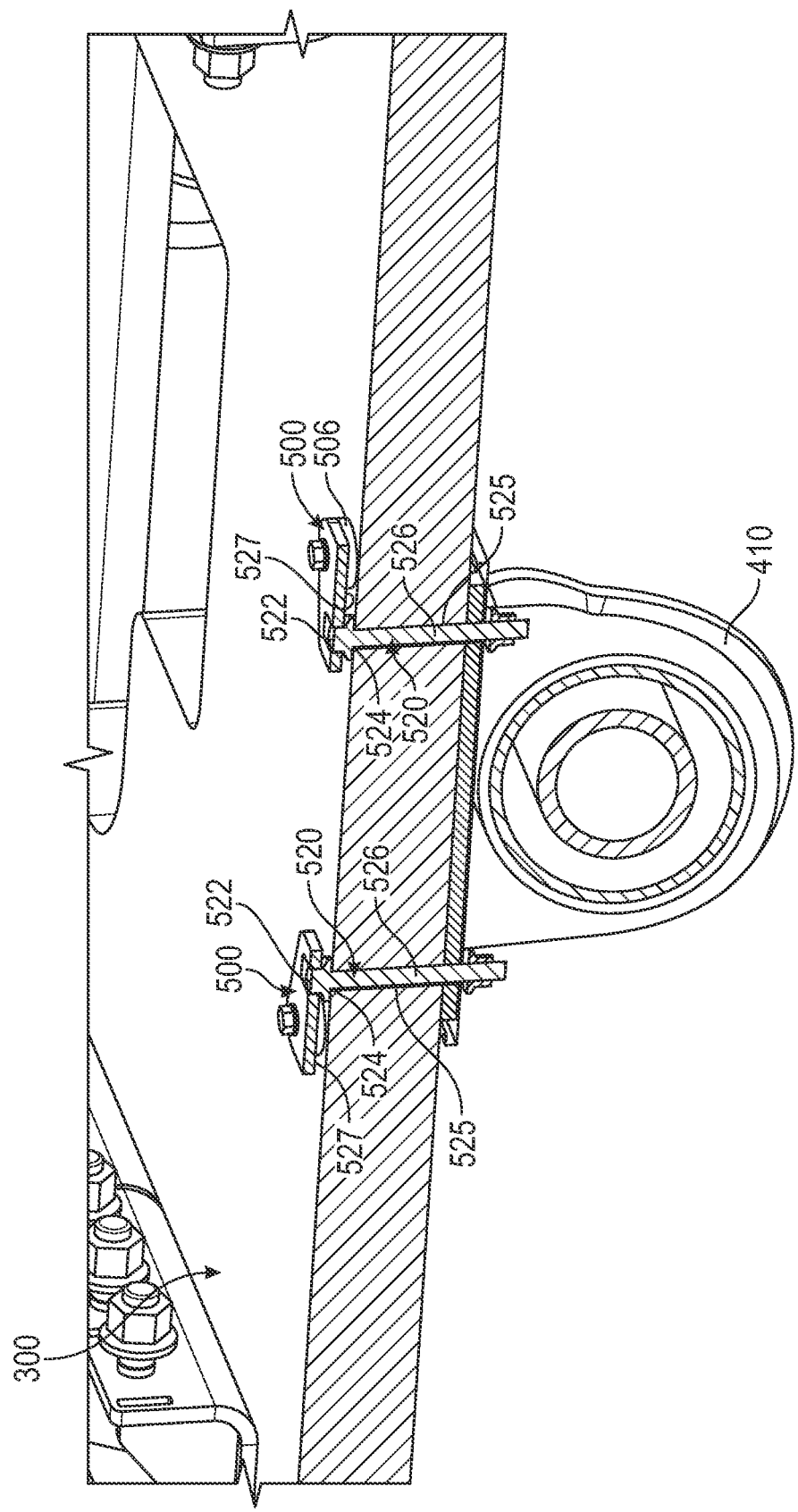
FIG. 20 is a sectional view through the retainer of FIG. 19.

Referring to FIGS. 18-20, a retainer is shown as locking plate 500. As shown in FIG. 18, the locking plate 500 defines a pair of connecting apertures 502 offset laterally from one another. The locking plate 500 also includes a slot 504 extending laterally across a portion of the locking plate 500, according to the exemplary embodiment shown in FIGS. 18-20. The locking plate 500 is attached (e.g., bolted) to a component of the vehicle 100 (e.g., the underbody armor panel 300 of FIGS. 16 and 17, etc.) through the connecting apertures 502. As shown in FIG. 19, the locking plate 500 is offset from the component (e.g., the underbody armor panel 300 of FIGS. 16 and 17, etc.) by retainer spacers 506. The locking plate 500 retains a bolt 520. As shown in FIG. 20, the bolt has a head 522, a flange 524 extending outward from a bottom portion of the head 522, and a shaft 526 extending from the bottom of the head 522. The shaft 526 extends through a receiving aperture 525 in the component (e.g., a receiving aperture 525 in the underbody armor panel 300 of FIGS. 16 and 17, etc.). In some embodiments, the receiving aperture 525 in the component is slotted to facilitate alignment of the bolt 520 with a second component (e.g., the bearing assembly 410, etc.).

As shown in FIG. 20, the head 522 has a hexagonal cross sectional shape, and the width of the slot 504 (shown in FIG. 19) is configured to tightly receive a fastener (e.g., opposing flats of hexagonal head of a bolt). The slot 504 (shown in FIG. 19) facilitates translation of the head 522 (e.g., front to back, side to side, etc.), but limits (e.g., prevents, etc.) rotation of the bolt 520. In one embodiment, a bottom surface 527 of the locking plate 500 contacts the flange 524, preventing the bolt 520 from being pushed outwards or away from a threaded end of the shaft 526. In some embodiments, the retainer spacers 506 are thicker than the flange 524 to facilitate translation of the bolt 520. Among its various uses, the locking plate 500 is useful in a situation where one side of a bolted connection is difficult to reach. By way of example, tightening the bolt 520 without the locking plate 500 would require an operator to reach over both sides of the underbody armor panel 300 simultaneously. In some instances, such a maneuver would prove difficult for a single operator due to the distance from the edge of the underbody armor panel 300 to the bolts 520. The locking plate 500 prevents the bolt 520 from rotating or being removed from its slot 504, requiring access to only one side (e.g., the underside, etc.) of the underbody armor panel 300 when tightening the bolt 520.

Referring to FIG. 12, extending the wings 304 laterally (e.g., in a lateral direction) beyond the frame rails 112 facilitates coupling a step assembly, shown as step 600, to the vehicle 100 to facilitate entry into and egress out of the front cabin 150 (shown in FIG. 11). As shown in FIG. 11, the step is coupled to the underbody armor panel 300 at a lateral position beyond the frame rails 112 and front cabin 150. As shown in FIG. 11, the vehicle 100 may include one or more steps 600 configured to facilitate access to the front cabin 150. By way of example, a front cabin 150 with two doors may include two of the steps 600, one proximate each door. As shown in FIG. 12, the step 600 couples to one of the wings 304 of the underbody armor panel 300 and extends in a lateral direction (e.g., laterally outward), away from the longitudinal centerline 114. FIGS. 12 and 21-23 show the position of the step 600 relative to the frame 110.

Figure 21:
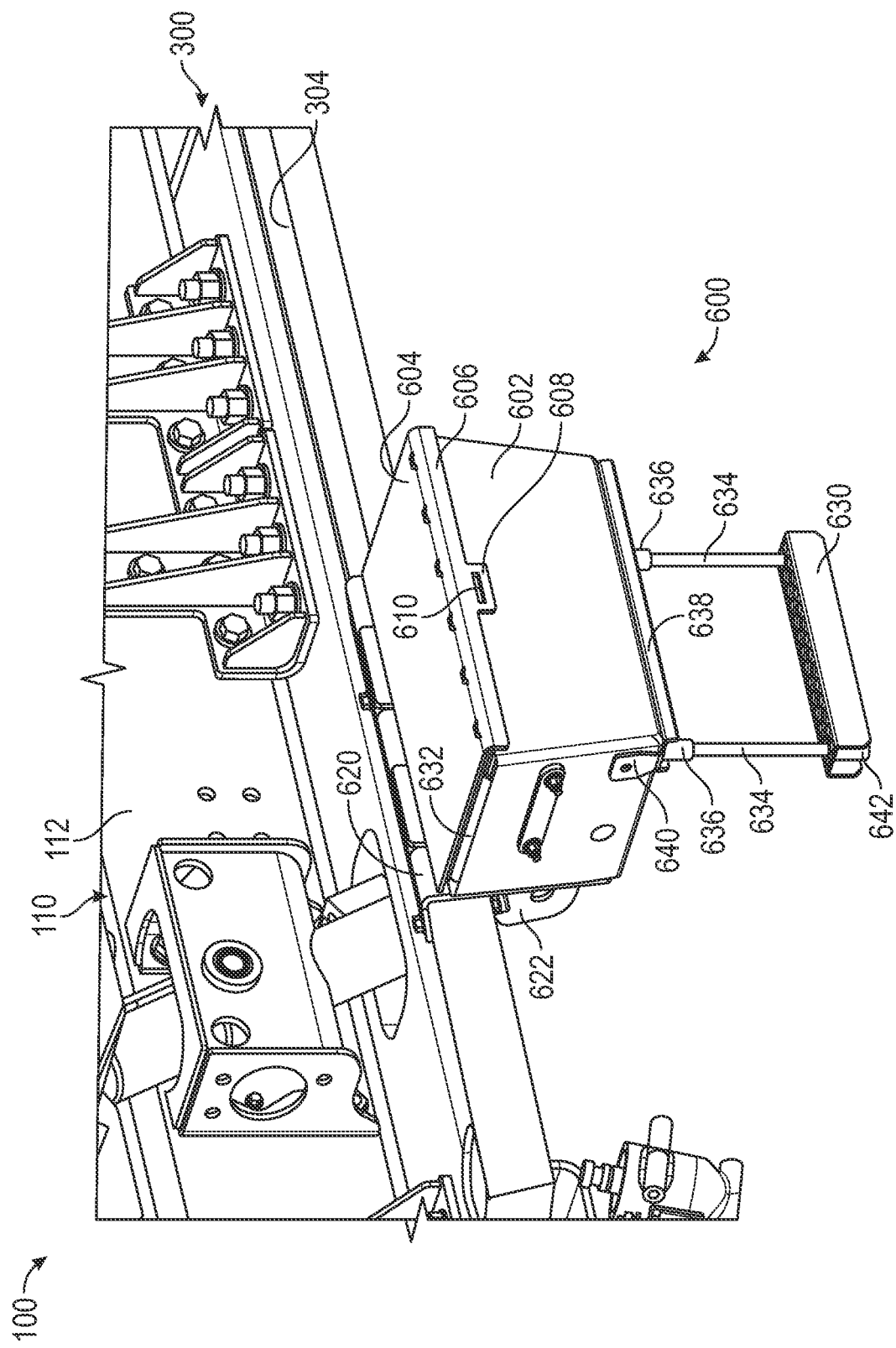
FIG. 21 is a perspective view of a step attached to an armor component, according to an illustrative embodiment.
Figure 22:
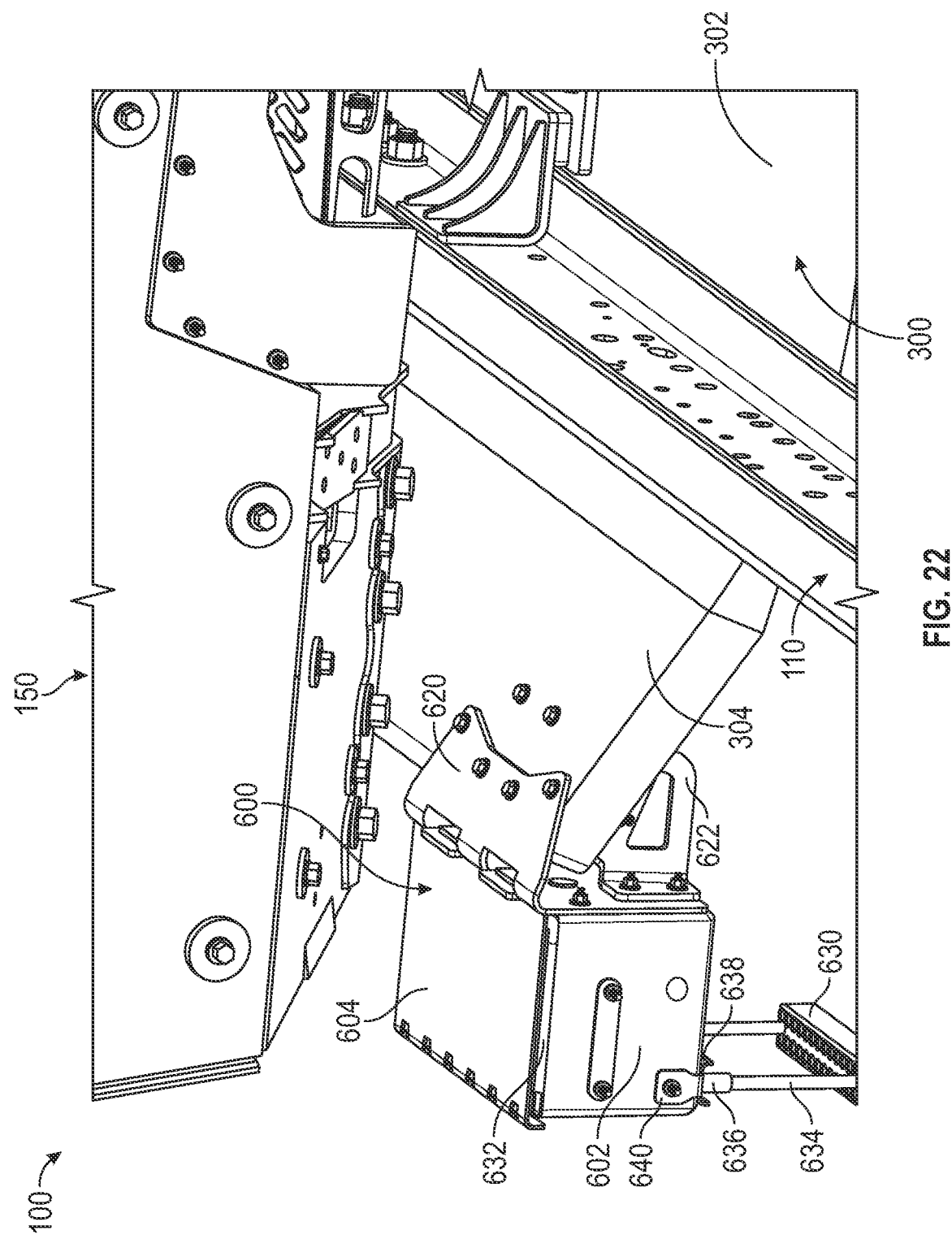
FIG. 22 is another perspective view of the step of FIG. 21.
Figure 23:
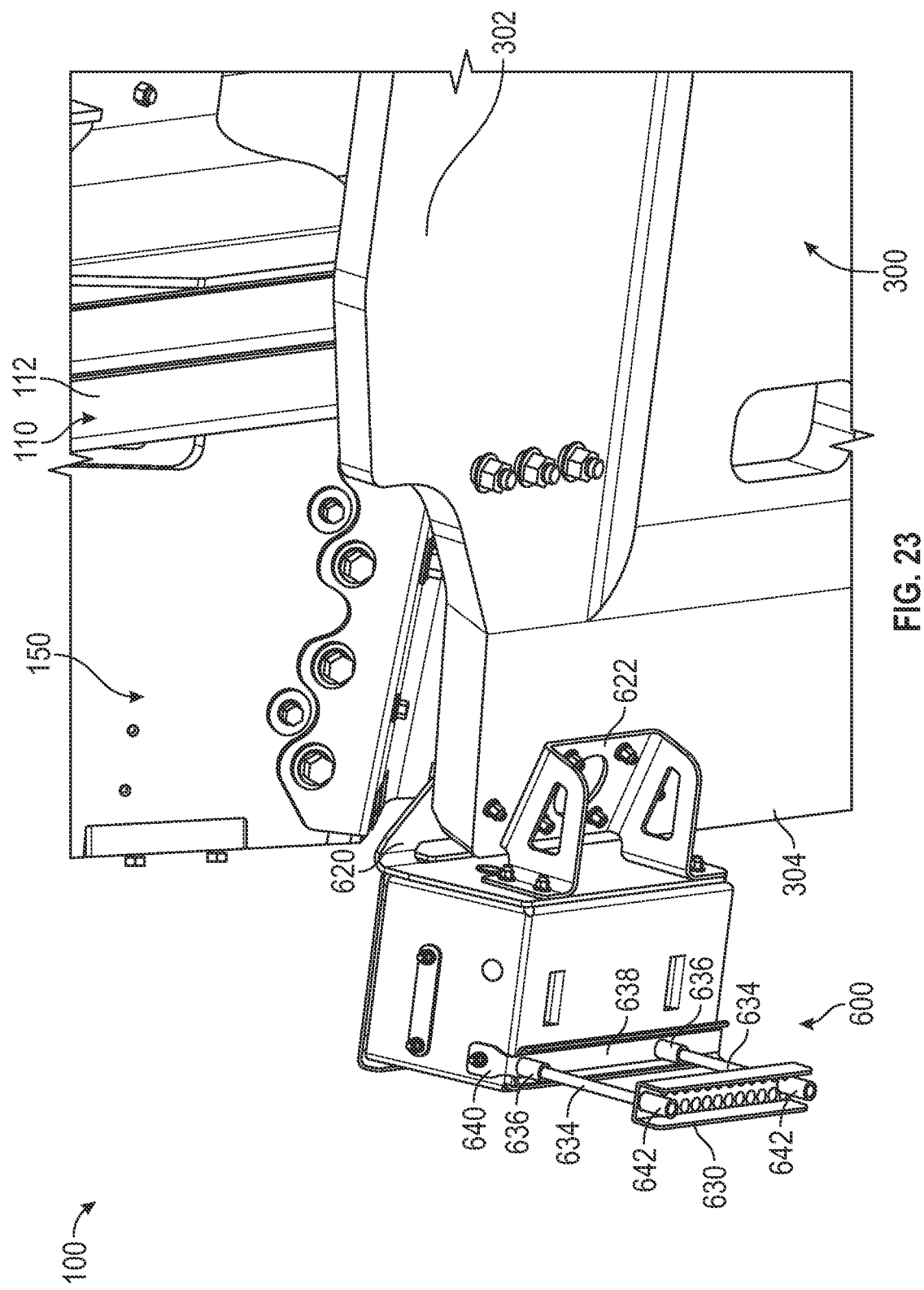
FIG. 23 is another perspective view of the step of FIG. 21.

Referring to FIGS. 21-23, the step 600 includes a main body 602 that is box-shaped and formed from four vertical walls and a bottom wall defining an interior space. A lid 604 is coupled to the main body 602 and movable between an open position and a closed position. In the closed position, the lid 604 obstructs access to the interior space defined by the main body 602 such that objects placed in the interior space are prevented from leaving the interior space. In the open position, the lid is positioned to facilitate access to the interior space (e.g., the lid 604 is moved away from the main body 602). Accordingly, the step 600 may be used as a storage container. In some embodiments, the lid 604 is pivotally coupled to the main body 602 such that the lid 604 can be rotated between the open and closed positions. In other embodiments, the lid 604 is slidable between the closed position, where the lid 604 is fixed to the main body 602 and where in the open position, the lid 604 can be removed from the step 600. In some embodiments, the lid 604 includes a locking mechanism to selectively hold the lid in the closed position. As shown in FIG. 12, by way of example, the lid 604 may have a flange 606 extending downward from the lid 604 and along an outside surface of the main body 602. The flange 606 may define an aperture 608 that receives a protrusion 610 extending from the main body 602. Alternatively, a pin may be selectively extended through an aperture and the main body 602, fixing the lid 604 relative to the main body 602. In other embodiments, the step 600 includes a different locking mechanism that may be any conventional locking mechanism (e.g., a hasp, a latch, a strap, etc.). The locking mechanism may be activated using a key to prevent access by unauthorized parties to the interior space of the main body 602.

Again referring to FIGS. 21-23, the step 600 includes a bracket, shown as first bracket 620, having a first portion coupled to a back side of the main body 602 and a second portion coupled to the top side of the wing 304. A second bracket, shown as second bracket 622, has a first portion coupled to the first portion of the first bracket 620 and a second portion coupled to the bottom side of the wing 304. In other embodiments, the first portion of the second bracket 622 is coupled directly to the main body 602. The first bracket 620 and the second bracket 622 couple the step 600 to the wing 304. In some embodiments, one or more bolts extend through the first bracket 620, the wing 304, and the second bracket 622, tightening the first bracket 620 and the second bracket 622 against their respective sides of the wing 304. The angle between the first portion and the second portion of each of the first bracket 620 and the second bracket 622 may be configured such that the lid 604 is oriented in a specific fashion relative to the rest of the vehicle 100 (e.g., such that the lid 604 is approximately parallel to the main section 302 of the underbody armor panel 300).

Again referring to FIGS. 21-23, the step 600 includes a bottom step 630 disposed a distance below the main body 602. The bottom step 630 and the lid 604 may be oriented approximately horizontally such that an occupant of the vehicle 100 can place their feet on the top surface of the bottom step 630 and/or the lid 604 to climb into the front cabin 150. By way of example, an occupant may place one foot on the bottom step 630, then one foot on the lid 604 when climbing into the front cabin 150 (shown in FIGS. 22 and 23), similar to how one might use a conventional household ladder. As shown in FIGS. 21 and 22, the top surfaces of the bottom step 630 and the lid 604 may be textured to prevent slipping.

Again referring to FIGS. 21 and 22, one or more flanges 632 proximal the lid 604 may extend into the interior space of the main body 602 from the sides of the main body 602. These flanges 632 may be positioned just beneath the lid 604

(e.g. to partially occupy a space between the lid 604 and the interior space) and contact the lid 604. These flanges 632 may be configured to support the weight of the occupant on the lid 604 to prevent the lid 604 from deforming during use. As shown in FIGS. 21-23, a pair of vertical members, shown as rods 634, extend between the bottom step 630 and the main body 602. An upper end of each of the rods 634 is coupled to the main body 602 via a boss 636 extending from a support bracket 638. The support bracket 638 includes flanges 640 that extend along the sides of the main body 602 and through which the support bracket 638 may be coupled to the main body 602. A lower end of each of the rods 634 is coupled to the bottom step 630 via a boss 642. The bosses 636 and the bosses 642 facilitate a strong connection between the rods 634 and the support bracket 638 and the rods 634 and the bottom step 630, respectively.

The concepts expressed herein may be applied in other ways not explicitly described herein. Expressed generically, a component (e.g., the steering tray 200, the backing plate 310) of a vehicle can have a certain structure when the vehicle is in an A-kit configuration. A portion of this structure (e.g., the spacers 270, the framework 350) may be removed and replaced with an armor component (e.g., the underbody armor panel 300) when reconfigured to a B-kit configuration. This invention takes advantage of the structure of the armor component, to which conventionally other components are not coupled, while still facilitating expeditious removal of the armor panel when the vehicle is reconfigured. In addition to a steering tray or an engine mount, this invention may be applied to various other components such as sway bars, exhaust mounting systems, hydraulic valves, electrical components, etc. The component may be coupled to any portion of the vehicle, such as a body assembly, a frame, or mission equipment. By way of example, a front cabin of a body assembly of a vehicle may have armor panels attached to it in a B-kit configuration that protect passengers during a blast event. These armor panels may replace a portion of the structure of a component that is attached to the front cabin, where the portion is normally present in an A-kit configuration.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A vehicle, comprising:
   a frame;
   an engine coupled to the frame;
   a front cabin coupled to the frame and selectively repositionable between an in-use position and a maintenance position;
   an armor component;
   a backing plate coupled to a spacer and configured to support the engine; and
   a bearing assembly configured to support a drive shaft;
   wherein the vehicle is reconfigurable between an A-kit configuration and a B-kit configuration, wherein, in the A-kit configuration, the armor component is removed from the vehicle, and wherein, in the B-kit configuration, the armor component is coupled to the front cabin;
   wherein, in the A-kit configuration, the bearing assembly is coupled to the spacer; and wherein, in the B-kit configuration, the bearing assembly is coupled to the armor component.

2. The vehicle of claim 1, further comprising a retainer coupled to the armor component, the retainer defining a slot extending laterally across a portion of the retainer, wherein the retainer is offset from the armor component by a retainer spacer, wherein the retainer further comprises a plurality of connecting apertures laterally offset from one another, and wherein the retainer is coupled to the armor component via the connecting apertures.

3. The vehicle of claim 1, wherein the armor component is an underbody armor panel positioned on an underside of the front cabin and extending longitudinally along at least a portion of the front cabin; and
wherein the underbody armor panel comprises a main section and one or more wings angled upwards relative to the main section.

4. The vehicle of claim 1, further comprising:
a tunnel disposed on a bottom side of the front cabin;
wherein the tunnel receives the engine when the front cabin is in the in-use position.

5. The vehicle of claim 4, wherein the armor component is a tunnel armor panel; and
wherein the tunnel armor panel is coupled to the front cabin via one or more bosses positioned on the tunnel.

6. The vehicle of claim 4,
wherein the spacer and the backing plate cooperatively support a dynamic load from the engine.

7. The vehicle of claim 1, further comprising a steering tray, the steering tray defining:
a first tray aperture sized to receive a first fastener, the first tray aperture having a first width in a lateral direction; and
a second tray aperture sized to receive a second fastener, the second tray aperture having a second width in the lateral direction, wherein the second width is greater than the first width;
wherein the steering tray is removably coupled to the frame.

8. The vehicle of claim 7, further comprising a spacer having the same thickness as the armor component;
wherein, in the A-kit configuration, the spacer couples the steering tray to the frame; and
wherein, in the B-kit configuration, the armor component couples the steering tray to the frame.

9. The vehicle of claim 1, wherein, in the in-use position, the front cabin is oriented parallel to the frame; and
wherein, in the maintenance position, the front cabin is rotated upwards relative to the frame.

10. The vehicle of claim 1, wherein, in the B-kit configuration, the spacer is removed.

11. A vehicle, comprising:
a frame;
an engine coupled to the frame;
a front cabin coupled to the frame and selectively repositionable between an in-use position and a maintenance position;
an armor component; and
a steering tray defining:
a first tray aperture sized to fit tightly around a first fastener in at least one of a lateral direction and a longitudinal direction; and
a second tray aperture sized to fit tightly around a second fastener in the longitudinal direction;
wherein the vehicle is reconfigurable between an A-kit configuration and a B-kit configuration, wherein, in the A-kit configuration, the armor component is removed from the vehicle, and wherein, in the B-kit configuration, the armor component is coupled to the front cabin.

12. The vehicle of claim 11, wherein the first tray aperture and the second tray aperture are configured to facilitate removal of the steering tray when changing between the A-kit configuration and the B-kit configuration.

13. The vehicle of claim 12, further comprising a spacer having the same thickness as the armor component;
wherein, in the A-kit configuration, the spacer couples the steering tray to the frame; and
wherein, in the B-kit configuration, the armor component couples the steering tray to the frame.

14. The vehicle of claim 11, further comprising a retainer coupled to the armor component, the retainer defining a slot extending laterally across a portion of the retainer, wherein the retainer is offset from the armor component by a retainer spacer.

15. The vehicle of claim 14, wherein the retainer further comprises a plurality of connecting apertures laterally offset from one another, and wherein the retainer is coupled to the armor component via the connecting apertures.

16. A vehicle, comprising:
a frame;
an engine coupled to the frame;
a front cabin coupled to the frame and selectively repositionable between an in-use position and a maintenance position;
an armor component; and
a steering tray defining:
a first tray aperture sized to receive a first fastener, the first tray aperture having a first width in a lateral direction; and
a second tray aperture sized to receive a second fastener, the second tray aperture having a second width in the lateral direction, wherein the second width is greater than the first width;
wherein the vehicle is reconfigurable between an A-kit configuration and a B-kit configuration, wherein, in the A-kit configuration, the armor component is removed from the vehicle, and wherein, in the B-kit configuration, the armor component is coupled to the front cabin.

17. The vehicle of claim 16, wherein the first tray aperture and the second tray aperture are configured to facilitate removal of the steering tray when changing between the A-kit configuration and the B-kit configuration.

18. The vehicle of claim 17, further comprising a spacer having the same thickness as the armor component;
wherein, in the A-kit configuration, the spacer couples the steering tray to the frame; and
wherein, in the B-kit configuration, the armor component couples the steering tray to the frame.

19. The vehicle of claim 16, further comprising a retainer coupled to the armor component, the retainer defining a slot extending laterally across a portion of the retainer, wherein the retainer is offset from the armor component by a retainer spacer.

20. The vehicle of claim 19, wherein the retainer further comprises a plurality of connecting apertures laterally offset from one another, and wherein the retainer is coupled to the armor component via the connecting apertures.

* * * * *